United States Patent
Frerichs

(10) Patent No.: US 6,523,589 B1
(45) Date of Patent: Feb. 25, 2003

(54) RIM OF A VEHICLE WHEEL FOR TUBELESS PNEUMATIC TIRES WITH AN EMERGENCY RUNNING SUPPORT SURFACE FORMED ON THE RADIALLY OUTER CARCASS SURFACE OF THE RIM

(75) Inventor: Udo Frerichs, Langenhagen (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/609,638

(22) Filed: Jul. 3, 2000

(30) Foreign Application Priority Data

Jul. 5, 1999 (DE) .......................................... 199 30 939

(51) Int. Cl.[7] .......................... B60B 21/10; B60C 15/02; B60C 17/02
(52) U.S. Cl. ..................................... 152/379.3; 152/520
(58) Field of Search .......................... 152/379.3, 379.4, 152/379.5, 380, 520, 540, DIG. 20, 397, 398, 544, 516, 541, 547, 152, 155, 165, 527, 529

(56) References Cited

U.S. PATENT DOCUMENTS

| | | | | |
|---|---|---|---|---|
| 1,932,191 A | * | 10/1933 | Shoemaker | 152/520 |
| 4,573,509 A | * | 3/1986 | Smith et al. | 152/158 |
| 4,623,009 A | * | 11/1986 | Seitz et al. | 152/380 |
| 4,630,662 A | * | 12/1986 | Howind | 152/397 |
| 4,635,697 A | * | 1/1987 | Rach et al. | 152/544 |
| 4,732,198 A | * | 3/1988 | Frerichs et al. | 152/544 |
| 4,798,418 A | * | 1/1989 | Kempf et al. | 152/380 |
| 5,082,040 A | * | 1/1992 | Spitz | 152/379.3 |
| 5,332,017 A | * | 7/1994 | Imamiya et al. | 152/527 |
| 5,524,688 A | * | 6/1996 | Trares et al. | 152/540 |
| 5,885,383 A | * | 3/1999 | French | 152/158 |
| 6,070,632 A | * | 6/2000 | Huinink et al. | 152/379.5 |

FOREIGN PATENT DOCUMENTS

| | | |
|---|---|---|
| DE | 3000428 | 7/1981 |
| DE | 19530939 | 9/1996 |

* cited by examiner

Primary Examiner—S. Joseph Morano
Assistant Examiner—Jason R. Bellinger
(74) Attorney, Agent, or Firm—Greenblum & Bernstein, P.L.C.

(57) ABSTRACT

Rim for a vehicle tire with an emergency surface, vehicle tire with tubeless pneumatic tire and emergency surface, and process of forming emergency surface. The rim includes a radially outer surface and an emergency running support surface formed on the radially outer surface. The emergency running support surface includes an annular layer of at least one of rubber, rubber-like material, and plastic. The annular layer is vulcanized onto the radially outer surface. The vehicle wheel includes a tubeless pneumatic tire, at least one rim comprising a radially outer surface, and an emergency running support surface formed on the radially outer surface. The emergency running support surface includes an annular layer of at least one of rubber, rubber-like material, and plastic. The annular layer is vulcanized onto a the radially outer surface. The process includes forming an annular layer on a load-bearing structure of the rim, in which the annular layer comprises one of rubber, rubber-like material, and plastic, and vulcanizing the annular layer on the load-bearing structure.

18 Claims, 19 Drawing Sheets

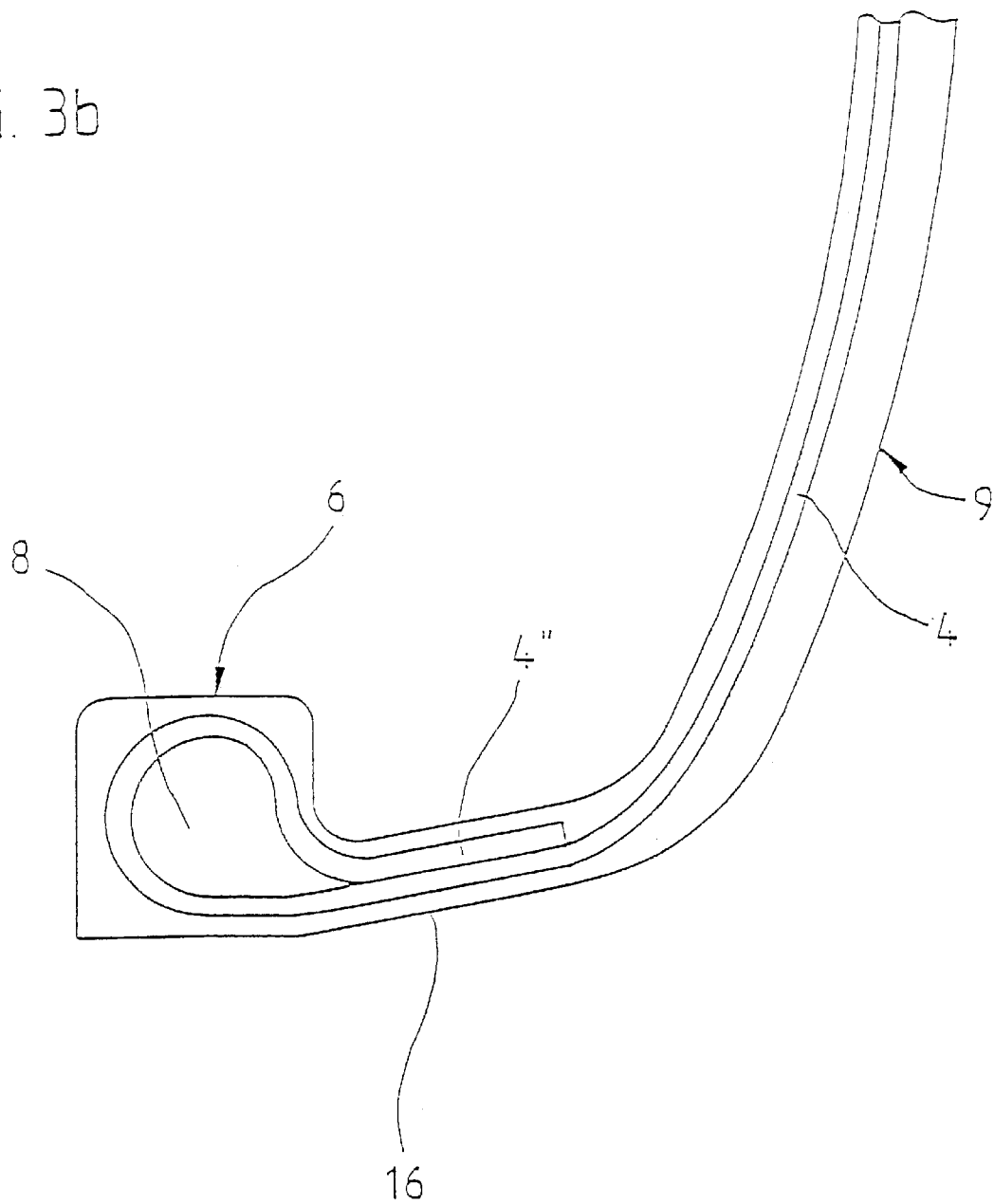

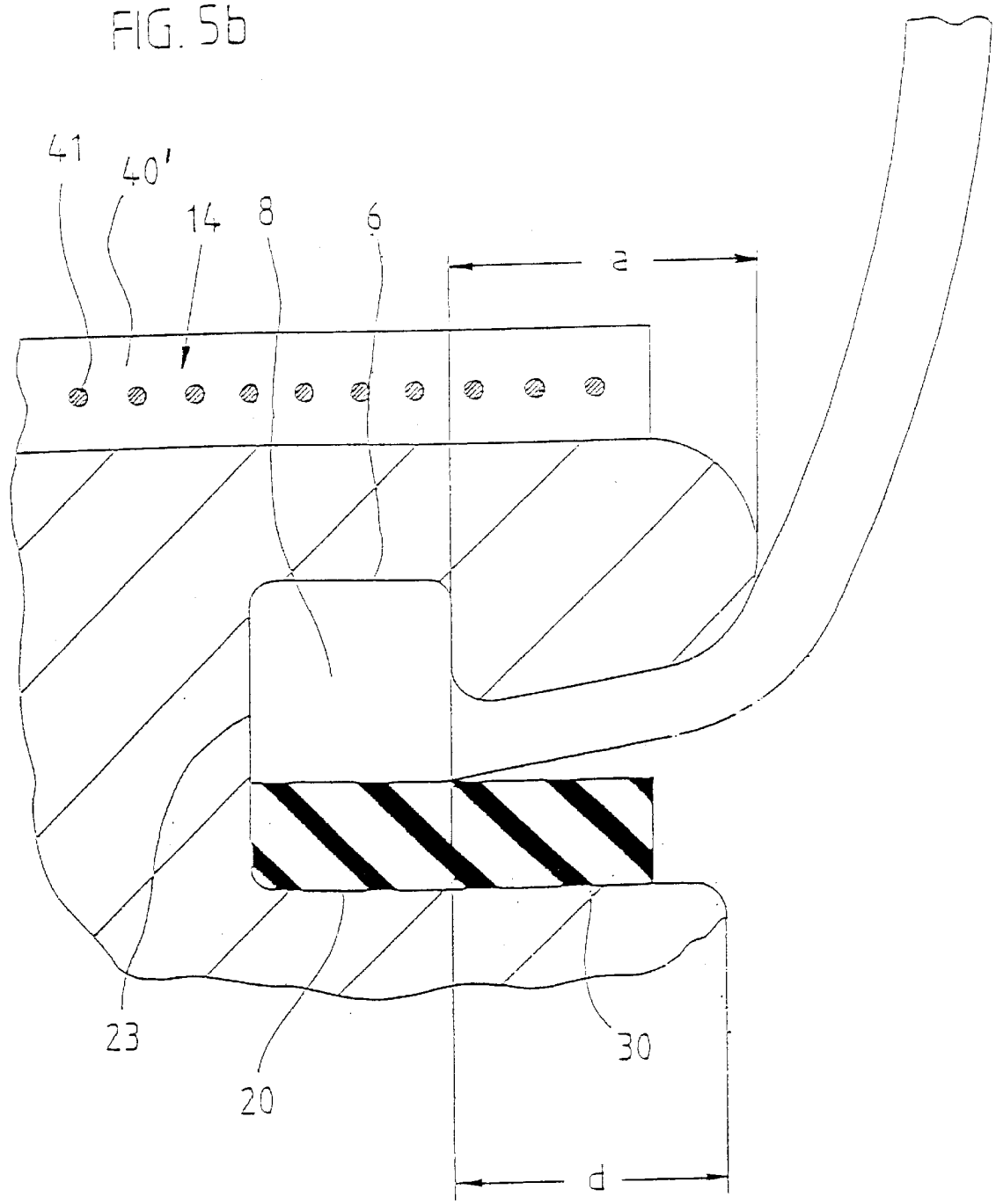

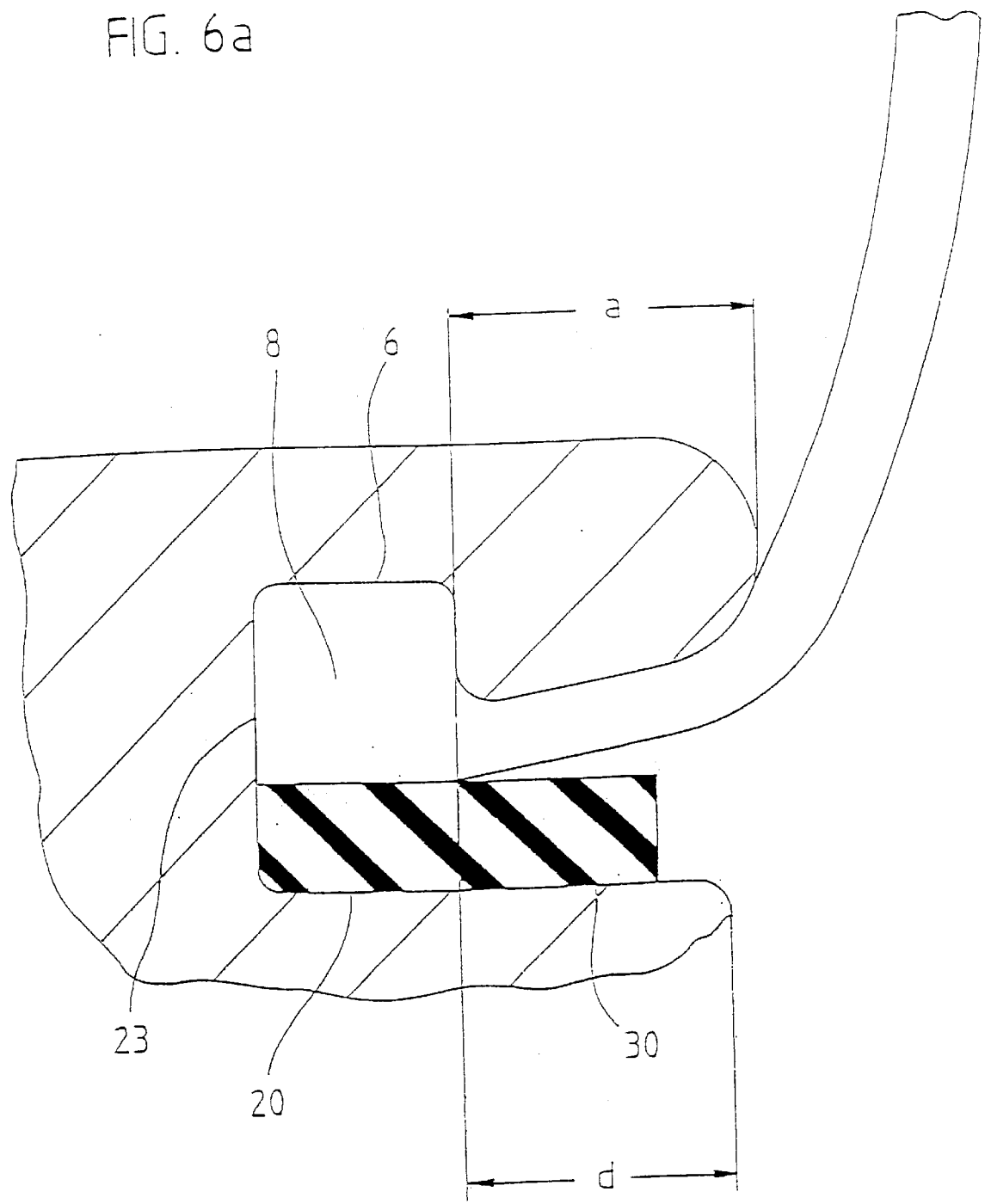

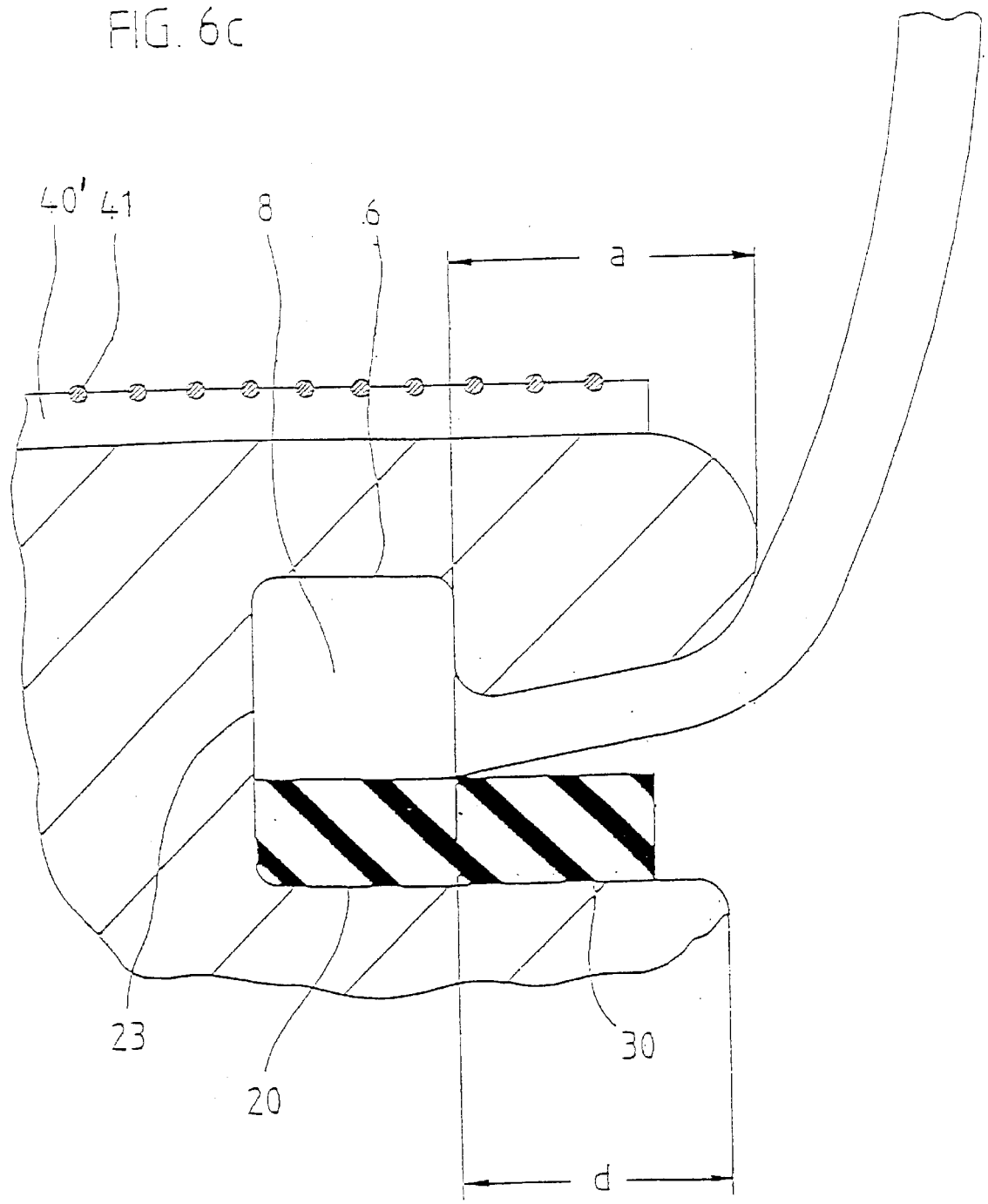

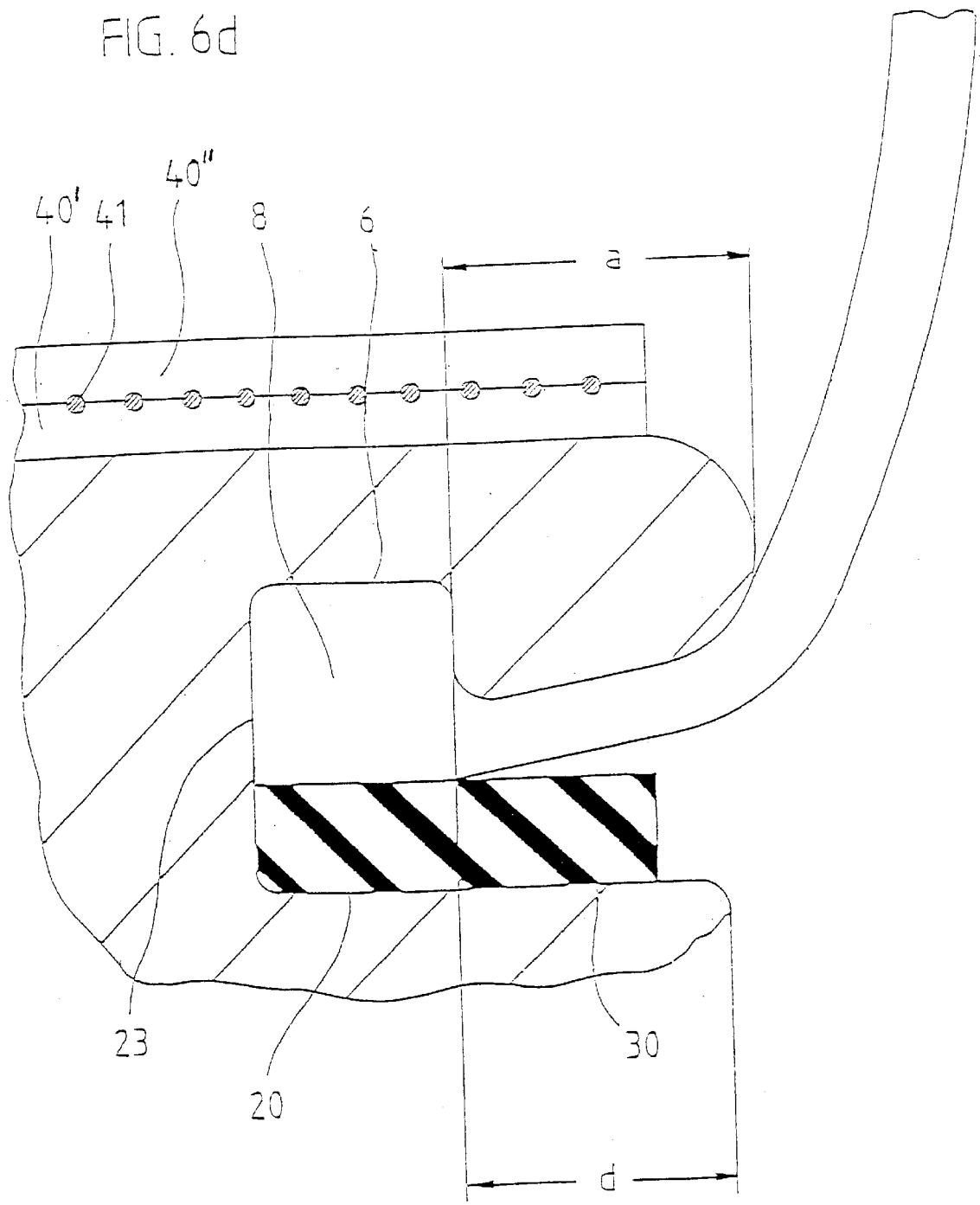

RIM OF A VEHICLE WHEEL FOR TUBELESS PNEUMATIC TIRES WITH AN EMERGENCY RUNNING SUPPORT SURFACE FORMED ON THE RADIALLY OUTER CARCASS SURFACE OF THE RIM

CROSS-REFERENCE TO RELATED APPLICATIONS

The present application claims priority under 35 U.S.C. §119 of German Patent Application No. 199 30 939.6, filed on Jul. 5, 1999, the disclosure of which is expressly incorporated by reference herein its entirety.

BACKGROUND OF THE INVENTION

1. Field of the Invention

The present invention relates to a rim of a vehicle wheel for tubeless pneumatic tires. The rim includes an emergency running support surface formed on a radially outer carcass surface of the rim.

2. Discussion of Background Information

Tubeless vehicle pneumatic tires of modern design are customarily formed into beads on the radially inner ends of their sidewalls. A carcass of radial design formed of strength supports coated with rubber extends from tire bead to tire bead. A ring-shaped, tenacious, rigid bead core of steel, arranged concentrically to the tire axis and in which the carcass is anchored, is formed in each tire bead. During the mounting of the vehicle pneumatic tire on the rim, the vehicle pneumatic tire is fixed with its bead on the radially outer jacket surface of the rim. The high tenacity and rigidity of the bead, which is caused by the tenacity and rigidity of the bead core, ensures the sealing in the rim/tire connection desired in a tubeless tire and ensures the tight seat of the tire on the rim when the tire is in the inflated state. The high-tensile-rigidity, tenacious design of the bead core also prevents an axial slippage of the vehicle wheel from the rim over the rim flange, which faces radially outwards, during demanding driving maneuvers.

To mount or dismount the vehicle pneumatic tire with a one-piece rim, the tenacious, high-tensile-rigidity bead must be moved with its inside diameter over the outside diameter of the rim flange, which is larger than the inside diameter of the rigid bead. To make this possible, additional expenditure, e.g., the formation of the rim with a well base, is required.

If there is a loss of air pressure, the tire sidewall buckles. It can be pressed thereby on the rim flange formed on the rim for the axial securing of the vehicle pneumatic tire. When the vehicle continues to travel, the tire sidewall and the rim flange may be destroyed. The vehicle pneumatic tire can spring off the rim.

In order to prevent this and to enable safe continued travel in spite of a loss of air pressure, it has been suggested to construct the rim, on the radial outer side of the one-piece rim, with additional emergency running support surfaces projecting radially above the rim flange, on which the radially inner side of the tread area of the vehicle pneumatic tire supports itself during a loss of air pressure and thus guarantees emergency running properties after a loss of air pressure. The mounting and demounting of the vehicle pneumatic tires on such rims has proved to be difficult, since the tenacious, rigid beads must be moved over the even larger outside diameter of the emergency running support surfaces, and the emergency running support surfaces additionally limit the axial space available between the bead seat surfaces on the rims for the insertion of mounting aids, e.g., for the construction of a well base. In order to be able to mount the rigid, tenacious bead at all, the practicable ratio between the outside diameter of the emergency running support surface and the inside diameter of the tenacious, rigid bead is very limited. The outside diameter of the emergency running support surface must be selected so that the rigid bead can still be moved over it. As a result, the emergency running support surfaces are largely determined by the comparatively small inside diameter of the rigid bead and are thus determined by a parameter that is not significant for the emergency running properties. The vehicle pneumatic tires can no longer be mounted over larger outside diameters of the emergency running support surfaces of the rims that are tailored to optimum emergency running properties.

For CTS (Continental Tire System) tires, it is known to support tubeless vehicle pneumatic tires with their beads on support surfaces on the radially inner side of the one-piece CTS rim formed with emergency running support surfaces on its radially outer side. In each tire bead, a ring-shaped, tenacious, pressure-resistant bead core of steel is formed that is arranged concentrically to the tire axis in which the carcass is anchored. During mounting of the CTS vehicle pneumatic tire on the rim, the vehicle pneumatic tire is fixed with its bead on the radially inner jacket surface of the rim. The high tenacity and pressure-resistance of the bead, which is caused by the tenacity and pressure-resistance of the bead core, ensures the sealing in the rim/tire connection desired in a tubeless tire and ensures the tight seat of the tire on the rim when the tire is in the inflated state. The pressure-resistant, tenacious design of the bead core also prevents an axial slippage of the vehicle wheel from the rim over the rim flange, which faces radially inwards on the radially inner side of the rim, during demanding driving maneuvers. Such a tire is known, for example, from DE 30 00 428 C2.

Since both the rim seat and the rim flange are formed on the radially inner side of the rim, in a CTS tire a larger axial length area is available for the construction of emergency running support surfaces on the radially outer jacket surface of the rim than in the conventionally fixed tire/wheel system on the radially outer jacket surface of a rim. The rim flange no longer represents a rim element disturbing emergency running, on the radially outer side of the CTS rim.

For mounting or dismounting the CTS vehicle pneumatic tire, the tenacious, pressure-resistant bead must be moved with its inside diameter on the radially outer jacket surface of the rim over the outside diameter of the emergency running support surfaces, which is larger than the inside diameter of the rigid bead, and on the radially inner jacket surface of the rim over the inside diameter, which is smaller than the inside diameter of the rigid bead. In order to make this possible, additional expenditure, e.g., the design of the rim with a high bed on the radially inner jacket surface, is required, as well as laborious special mounting techniques.

The mounting and dismounting of vehicle pneumatic tires on such rims has thus likewise proved to be difficult since the tenacious, pressure-resistant CTS beads must also be moved over the even larger outside diameter of the emergency running support surfaces on the radially outer side of the rim and over the inside diameter on the radially inner jacket surface of the rim, which is smaller than the inside diameter of the rigid bead. In order to be able to mount the pressure-resistant, tenacious bead at all, the practicable ratio between the outside diameter of the emergency running support surface and the inside diameter of the tenacious, pressure-resistant bead is still very limited for the CTS tire as well. The outside diameter of the emergency running support surface must be selected so as to be only just large enough for the rigid bead still to be able to be moved over it. The result of this is that for the CTS tire as well, the emergency running support surfaces are still determined to a large extent by the comparatively small diameter of the rigid bead core and thus by a parameter that is not significant for the emergency running properties. The vehicle pneumatic tires with their rigid beads can no longer be mounted over the larger outside diameters of the emergency running support surfaces of rims that are tailored to optimum emergency running properties.

From DE 19530939 C1, a vehicle wheel with a one-piece rim and a tubeless, beadless pneumatic tire is known in which the radially outer jacket surface of the rim is formed with emergency running support surfaces. The beadless vehicle pneumatic tire is vulcanized onto the radially inner jacket surface of the rim. The bead-free design of the vehicle pneumatic tire enables the emergency running; support surfaces to be designed independently of bead diameters in such a tire. For designing the emergency running support surfaces in such a vehicle pneumatic tire, parameters that are significant for emergency running can be better taken into consideration so that even the larger diameters of the emergency running support surfaces desired for optimizing emergency running properties can be implemented without difficulty. However, such vehicle pneumatic tires cannot be dismounted or changed without being destroyed.

Designing emergency running support surfaces as a rubber ring fastened to a load-bearing surface made of metal is known. For this purpose, the rubber ring slides axially onto the load-bearing surface and is then fastened with positive engagement or frictional engagement. The rubber ring must be securely and precisely positioned in the mounted state of the vehicle wheel and remain so positioned during an emergency running operation. For this purpose, it must be exactly positioned during application and be securely fixed in this position. However, in order to slide it on, there must be clearance between the rubber ring and the load-bearing surface. These contradictory requirements for mounting the rubber ring and for operation require considerable expense for mounting and securing the fastening of the rubber ring on the load-bearing surface.

SUMMARY OF THE INVENTION

The present invention provides emergency running support surfaces of a vehicle wheel for tubeless pneumatic tires in a simple and reliable manner. In particular, the emergency running support surface of the rim, in accordance with the invention, is formed of an annular layer made of rubber, rubber-like substances or plastic vulcanized onto a load-bearing metal structure. Further, a vehicle tire can be formed utilizing the above-noted rim. Still further, the emergency running support surface, in accordance with the instant invention, is produced by building up or forming an annular layer made of rubber or rubber-like substances or plastic onto a load-bearing metal structure and subsequently vulcanizing the annular layer onto the load-bearing metal structure.

The emergency running support surface can be positioned very precisely on the load-bearing surface in a simple way in a plastically deformable state and securely fixed during vulcanization by being vulcanized onto the load-bearing surface in this position so that the emergency running support surface also reliably retains its precisely defined position on the rim with a high level of certainty.

Arranging strength supports in the layer made of rubber provides the emergency running support surface with greater strength, e.g., according to the instant invention, after applying a first annular layer made of rubber or rubber-like substances or plastic, strength supports can be initially positioned on the layer and then another layer made of rubber or rubber-like substances or plastic can be positioned on the layer of strength supports. In this way, when the rubber or rubber-like substance or plastic is finally vulcanized, the annular layer is vulcanized onto the load-bearing metal structure with strength supports therein. In a particular embodiment, an advantageous binding effect can be achieved when the strength supports are filamentary or belt shaped, e.g., the filamentary or belt-shaped strength supports can initially be wound onto the first annular layer made of rubber or rubber-like substances or plastic to provide the desired strength supports. The strength supports are preferably monofilaments or multifilaments, e.g., of textile or steel, such that the strength supports are preferably made of nylon or another heat-shrinkable material, which shrinks due to the thermal effect during vulcanization and thereby builds up initial stress. By providing strength supports having at least one ply of strength supports that are arranged parallel to one another, which extend over the circumference of the rim, and which are aligned at an angle of about 0°–30° to the circumferential direction of the rim, the present invention enables, in a simple manner, the emergency running support surface to retain its shape particularly reliably and securely, even counteracting the centrifugal forces occurring at high operating speeds. Further, the strength supports can have one or more continuous strength supports extending over the circumference of the rim that are wound helically at an angle of about 0°–30° to the circumferential direction of the rim, which allows mechanically uniform production in a simple manner with the simultaneous use of a minimum number of ends of strength supports to be secured during application.

It may be particularly advantageous that the rim itself form the load-bearing metal structure, so that an emergency running support surface in a vehicle wheel can be created securely and reliably in a simple manner with only a few components. The weight and expense of producing a vehicle wheel with an emergency running support surface can be minimized thereby. Expense can be reduced further still by forming the rim as a single piece.

The design of the rim can further include at least one ring chamber designed as one piece in an axial forepart of the rim to accommodate a tire bead to fasten the tire on the rim. The at least one ring chamber can include a radially inner ring chamber wall, a radially outer ring chamber wall, an axially inside ring chamber wall that is oriented toward a center of the rim, and an axially outside ring chamber wall that is oriented toward an outside of the rim. The axially outside ring chamber wall forms a rim flange that is arranged from radially inside to axially outside toward the forepart of the rim in a radially outer area, and includes, in a radially inner area, an annular passage opening for inserting or removing the tire bead. This arrangement makes it possible to, in a simple and reliable manner, fasten the tire bead from the axial outside and, at the same time, utilize the carcass surface of the rim pointing radially outwards for an optimal formation of an emergency running support surface.

The wheel, in accordance with the invention, can include an emergency running support surface formed on the radially outer carcass surface of the rim, a bead designed to be thickened on each sidewall of the pneumatic tire an inside of the pneumatic tire to fasten the pneumatic tire to the rim. The rim can also include at least one ring chamber formed as one piece in an axial forepart of the rim that includes a radially inner ring chamber wall, a radially outer ring chamber wall, an axially inside ring chamber wall that is oriented toward a center of the rim, and an axially outside ring chamber wall that is oriented toward an outside of the rim. The axially outside ring chamber wall can form a rim flange that is arranged from radially inside to axially outside toward the axial forepart of the rim in a radially outer area, and is formed in its radially inner area with an annular passage opening. A filling ring can be solidly mounted radially with positive engagement within the ring chamber on the radially inner ring chamber wall. Moreover, the sidewall of the tire, at least in the operating state of the vehicle wheel, can extend from axially outside through the annular passage opening into the at least one ring chamber, such that bead in the ring chamber is solidly mounted radially on the radially outside and is designed with positive engagement at least on a radially outside and on an axially outside to the ring chamber so that the bead is connected with positive engagement with the rim to the radially outside, the axially outside, the axially inside and over the filling ring to the radially inside. The bead may be supported radially inwardly completely on the filling ring, especially over its entire axial extension. The bead can be inserted into the ring chamber axially through the passage opening in order to fasten the tire to the rim. The filling ring may be inserted radially inside of the bead in an axial direction. The bead can then be solidly mounted radially in the ring chamber on the radial outside of the filling ring and can be formed with positive engagement to the radial outside, to the axial inside, and to the axial outside to the ring chamber so that the bead is connected with positive engagement to the ring chamber designed as one-piece to the radially outside, the axially outside, to axially inside, and over the filling ring to the radially inner.

During vehicle wheel operation, both in normal as well as emergency running operation, after a loss of air pressure, there is a secure positive engagement to the axial outside and inside and to the radial outside and inside between a one-piece ring chamber of the rim and bead. Therefore, both the axial forces as well as those acting radially on the bead are introduced securely into the one-piece rim in the fastening area. In this way, the bead can securely and reliably retain its operating position in the ring chamber even in emergency running operation. The introduction of force from the bead to the rim is especially secure when the bead is supported to the radially inner completely on the filling ring over its entire axial extension. If the bead and the filling ring completely fill the ring chamber, a particularly reliable positive engagement is achieved between the bead and the rim.

A preferred design can be one in which, in the ring chamber, the bead also has a positive engagement to the axial inner ring chamber wall in the axial direction to the inside so that the position of the bead in the ring chamber can be maintained defined by positive engagement in the axial direction to the axial inside toward the axially inner ring chamber wall also in individual cases when stronger forces that cannot be excluded are directed axially to the inside and introduced to the bead.

It may be preferable for the filling ring to be designed to be cylindrical at its radially outer surface. This allows especially simple and reliable mounting and dismounting of the vehicle pneumatic tire on the rim. After the bead has been introduced to its fastening position in the ring chamber, it can be pushed into its fill position in the ring chamber by simple axial displacement of the filling ring onto the load-bearing surface of the ring chamber that is designed for this.

In this way, the positive engagement of the bead in the ring chamber is produced and secured. The positive engagement is removed by simple axial removal of the filling ring from its fill position so that the bead can be removed from the ring chamber and the vehicle pneumatic tire can be dismounted from the rim. In addition, the cylindrical design guarantees that the danger of unintentionally detaching the filling ring from the ring chamber due to undesired axial forces initiated by the tire bead into the fill ring can be reliably minimized.

According to an advantageous feature of the invention, the bead core can be modifiable in terms of its circumferential length, particularly in an elastic manner, to enable mounting by moving the bead over the emergency running support surface with a larger bead core diameter than in the fastened operating state of the bead and to move over the rim flange with a smaller bead core diameter than in the fastened operating state so that the formation of the emergency running support surfaces can be developed primarily corresponding to optimal emergency running properties and no longer as a function of the diameter of the bead core in the operating state and of the inside rim flange diameter. Therefore, the bead, which is modifiable in terms of its circumferential length, can be both mounted as well as dismounted in a simple and functionally secure manner, such that the emergency running support surfaces can be optimized for emergency running operation, the rim flange can be optimized with respect to the axial support for the bead, and the bead core in its operating state can be optimized with respect to its properties in the operating state.

By designing the vehicle pneumatic tire with an elastically modifiable circumferential bead length, it is especially simple and secure to achieve a change in the circumferential length from a first circumferential length to additional circumferential lengths modified individually corresponding to the respective requirements against the effect of restoring forces and back again into the first circumferential length utilizing the restoring forces.

The axial position of an emergency running support surface formed in the radially outer surface corresponds at least partially to the axial position of the bead fastened in the rim, which can be preferred for achieving especially good emergency running properties, since the tread can be adequately supported despite optimal interval width precisely in the especially critical shoulder areas between the tire beads of the vehicle pneumatic tire. It is especially advantageous if an emergency running support surface is always formed on the axially side areas of the radially outer surface of the rim to support the shoulder areas that are particularly critical in emergency running operation.

A design of the vehicle wheel in which the bead core is a rubber core integrated into the bead is particularly advantageous. The rubber core is simple to produce and can be anchored in the bead particularly simply and reliably. Accordingly, the bead can be designed in a simple, reliable manner, to be elastically extensible in its circumferential length. For a particularly secure seat, the rubber core is formed with a Shore A hardness in the range of approximately 80 to 100, and preferably in the range of between approximately 85 and 90.

In another embodiment of the vehicle wheel, the bead is designed completely coreless. The bead can be produced particularly simply without additional expenditure for a core, is to be designed so as to be adequately elastically extensible in its circumferential length by means of its coreless rubber material, and yet can be anchored in the ring chamber securely and reliably by means of the positive engagement.

It is preferred to design the vehicle wheel in such a way that the axially outer front face is formed as an axial bearing surface for the axial support of the lower tire sidewall. In this manner, the tire is supported axially in the lower sidewall area for achieving good handling properties when traveling around curves and, under particularly strong impact loads, can act as a spring, eliminating the axial support effect into the lower sidewall area for achieving good comfort properties.

Designing a vehicle wheel in which the largest outside diameter of the emergency running support surfaces is greater by a factor of between about 1.05 and about 1.3 than the inside ring diameter of the bead core in the mounted state of the vehicle wheel allows for optimum emergency running properties by the particularly large outside diameter of the emergency running support surfaces, while maintaining the optimum small inner ring diameter of the bead core for good springing of the tire and thus good comfort properties. The design of a vehicle wheel in which the largest outside diameter of the emergency running support surfaces is greater by a factor of between about 1.1 and about 1.2 than the inside ring diameter of the bead core in the mounted state of the vehicle wheel represents an optimum design range of standard tire dimensions for solving the conflicting goals of good emergency running properties, and comfort and weight of the vehicle wheel.

Designing a vehicle wheel in which the bead core has an extensibility and/or compressibility of about 5 to 30%, enables a simple and reliable mounting in spite of optimum emergency running properties by the formation of particularly large outside diameters of the emergency running support surfaces in spite of maintaining the achievement of good springing of the tire and thus good comfort properties by optimum small inside ring diameters of the bead core. By a simple, e.g., an elastic, stretching and/or compression of the bead, the bead is adjusted with respect to the optimum diameter required for mounting or demounting over the emergency running support surfaces, to the optimum diameter required for mounting or demounting over the inwards-facing rim flange, and to the optimum diameter required for a secure seat in the ring chamber. The design of a vehicle wheel in which the bead core has an extensibility and/or compressibility of about 10 to 20% enables a simple and reliable mounting in the optimum design range of standard tire dimensions for solving the conflicting goals of good emergency running properties, and comfort and weight of the vehicle wheel.

The bead core can have an extensibility of about 5 to 30% and a compressibility of about 1 to 5% and the bead core is unstretched and uncompressed, in particular in the mounted state of the vehicle wheel. The bead core is brought to an optimally large diameter for mounting or demounting over the emergency running support surface, by a simple, in particular an elastic, stretching from the unstretched and uncompressed state. The bead core is brought to an optimally small diameter for mounting or demounting over the inwards-facing rim flange by a simple, in particular an elastic, compression from the unstretched and uncompressed state. The design of a vehicle wheel in which the bead core has an extensibility of about 10 to 20% and a compressibility of about 2.5 to 3.5%, enables a simple and reliable mounting in the optimum design range of standard tire dimensions for solving the conflicting goals of good emergency running properties, and comfort and weight of the vehicle wheel. It is particularly advantageous for the bead core to be unstretched and uncompressed in the mounted state of the vehicle wheel, and thus in the circumferential direction it is largely free of inner forces acting in the circumferential direction. Here, the elastically extensible and elastically compressible design is particularly advantageous. The bead core is stretched in the circumferential direction from the unstretched and uncompressed state for mounting over the emergency running support surfaces, counteracting the elastic restoring forces. After mounting over the emergency running support surfaces, it is again reduced in its circumferential length to the unstretched and uncompressed state by the restoring forces. For mounting over the rim flange, which faces radially inwards, the bead core is compressed in the circumferential direction from the unstretched and uncompressed state, counteracting the elastic restoring forces. After mounting over the rim flange, it is again enlarged in its circumferential length to the unstretched and uncompressed state in the ring chamber by means of the restoring forces. The demounting takes place in a corresponding manner.

The present invention is directed to a rim of a vehicle tire for tubeless to pneumatic tires. The rim includes a radially outer surface and an emergency running support surface formed on the radially outer surface. The emergency running support surface includes an annular layer of at least one of rubber, rubber-like material, and plastic. The annular layer is vulcanized onto the radially outer surface.

In accordance with a feature of the instant invention, strength supports can be arranged in the annular layer. Further, the annular layer can include rubber. The strength supports may include one of filamentary and belt-shaped strength supports. The strength supports include one of monofilaments and multifilaments, and the strength supports can include one of textile and steel material. The material for the strength supports can be a heat-shrinkable material. Further, the heat-shrinkable material comprises nylon. Moreover, the strength supports may include at least one ply of strength supports that are arranged substantially parallel to one another and which extend over a circumference of the rim. The strength supports can be aligned at an angle of about 0°–30° to a circumferential direction of the rim. Still further, the strength supports can include at least one continuous strength support which extends over a circumference of the rim that are helically wound at an angle of about 0°–30° to the circumferential direction.

In accordance with another feature of the present invention, a load bearing structure can be provided. The annular layer may be vulcanized onto the load bearing structure. The rim can be formed as a single piece.

According to still another feature of the invention, at least one ring chamber can be composed of one piece in an axial forepart of the rim, which is arranged to accommodate a tire bead and to fasten a tire onto the rim. The at least one ring chamber can include a radially inner ring chamber wall, a radially outer ring chamber wall, an axially inside ring chamber wall oriented toward a center of the rim and an axially outside ring chamber wall that oriented toward an outside of the rim. The axially outside ring chamber wall may delimit a rim flange that is arranged from radially inside to axially outside toward the axial forepart in a radially outer area. An annular passage opening may be formed in a radially inner area, which arranged for inserting and removing the tire bead.

The present invention is directed to a vehicle wheel that includes a tubeless pneumatic tire, at least one rim comprising a radially outer surface, and an emergency running support surface formed on the radially outer surface. The emergency running support surface includes an annular layer of at least one of rubber, rubber-like material, and plastic. The annular layer is vulcanized onto a the radially outer surface.

According to a feature of the invention, the rim can be a one-piece rim.

In accordance with another feature of the present invention, the tubeless pneumatic tire may include sidewalls and beads which are thickened on each sidewall toward an inside of the pneumatic tire to fasten the pneumatic tire to the rim. The rim can include at least one ring chamber formed as a single piece in an axial forepart of the rim with a radially inner ring chamber wall, a radially outer ring chamber wall, an axially inside ring chamber wall that is oriented toward a center of the rim and an axially outside ring chamber wall that is oriented toward an outside of the rim. The axially outside ring chamber wall can delimit a rim flange that is arranged from radially inside to axially outside toward the axial forepart in a radially outer area. An annular passage opening can be formed in a radially inner area, which arranged for inserting and removing the tire bead. A filling ring can be adapted to be solidly mounted radially with positive engagement within the ring chamber on the radially inner ring chamber wall. The sidewalls, at least in the operating state of the vehicle wheel, can extend from axially outside through the annular passage opening toward the ring chamber wall, and the bead may be adapted to be solidly mounted in the ring chamber radially on a radial outside and is adapted to be positively engaged, at least to the radial outside and an axial outside to the ring chamber so that the bead is connected with positive engagement with the rim to the radially outside, to the axially outside, to the axially inside and over the filling ring to the radially inside. The bead may be supported radially inwardly completely on the filling ring over its entire axial extension.

According to still another feature of the present invention, the pneumatic tire may include a bead adapted to coupled the pneumatic tire to the rim. The bead can include a variable circumferential length. The bead can be variable in an elastic manner. Further, an axial position of the emergency running support surface formed in the radially outer carcass surface can correspond at least partially to an axial position where the bead is fastened in the rim.

In accordance with a further feature of the instant invention, the emergency running support surface may be formed on at least one axial side area of the radially outer surface, and is arranged to extend axially so that, toward the inside, a belt of the pneumatic tire is covered about 10–30% in its axial edge zones by a shoulder of the rim.

The pneumatic tire may include a bead comprising a rubber core, and the rubber core may have a Shore A hardness in a range of about 80–100. Further, the Shore A hardness of the rubber core can be in the range of about 85–90.

The filling ring can be adapted for at least one of detaching and fastening a bead of the pneumatic tire through axial movement. The at least one ring chamber can include a load-bearing surface on a radially inner side which extends over an entire axial extension, over which the filling ring is adapted to axially slide on and axially pull off, and the filling ring may include a load-bearing surface on a radial inner side.

A maximum diameter of the emergency running support surfaces may be greater by a factor of between about 1.05–1.3 than the inside ring diameter of a bead core in a mounted state of the vehicle wheel. Preferably, the maximum diameter of the emergency running support surfaces is greater by a factor of between about 1.1–1.2 than the inside ring diameter of the bead core in the mounted state of the vehicle wheel.

Moreover, the pneumatic tire may include a bead core having at least one of an extensibility and compressibility of between about 5–30%, and preferably, the at least one of the extensibility and compressibility of the bead core is between about 10–20%.

Still further, the pneumatic tire can include a bead core having an extensibility of between about 5–30%, and a compressibility of between about 1–5%, and the bead core can be at least one of unextended and uncompressed in a mounted state of the vehicle wheel. Further, the bead core can have an extensibility of between about 10–20%, and a compressibility of between about 2.5–3.5%.

The pneumatic tire can include a bead, which is adapted to fasten the pneumatic tire to the rim, and the pneumatic tire may be positioned adjacent to the rim in a lower sidewall area.

The present invention is directed to a process for producing a rim with an emergency running support surface. The process includes forming an annular layer on a load-bearing structure of the rim, in which the annular layer comprises one of rubber, rubber-like material, and plastic, and vulcanizing the annular layer on the load-bearing structure.

In accordance with a feature of the invention, the load-bearing structure may be a metal structure.

According to yet another feature of the present invention, the forming of the annular layer can include applying a first annular layer on the load-bearing structure. The process may further include applying strength supports onto the first annular layer, applying a second annular layer over the first annular layer and over the strength supports, and vulcanizing the first and second annular layers and the strength supports onto the load-bearing metal structure. The strength supports can be one of filamentary and belt-shaped strength supports, which are initially wound onto the first annular layer. Further, the second annular layer can include one of rubber, rubber-like material, and plastic.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 3a and 3b illustrate embodiments of the bead area in cross section;

FIGS. 5a and 5b illustrate the emergency running support surface; and

FIGS. 6a–6d schematically illustrate the production of emergency running support surface.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
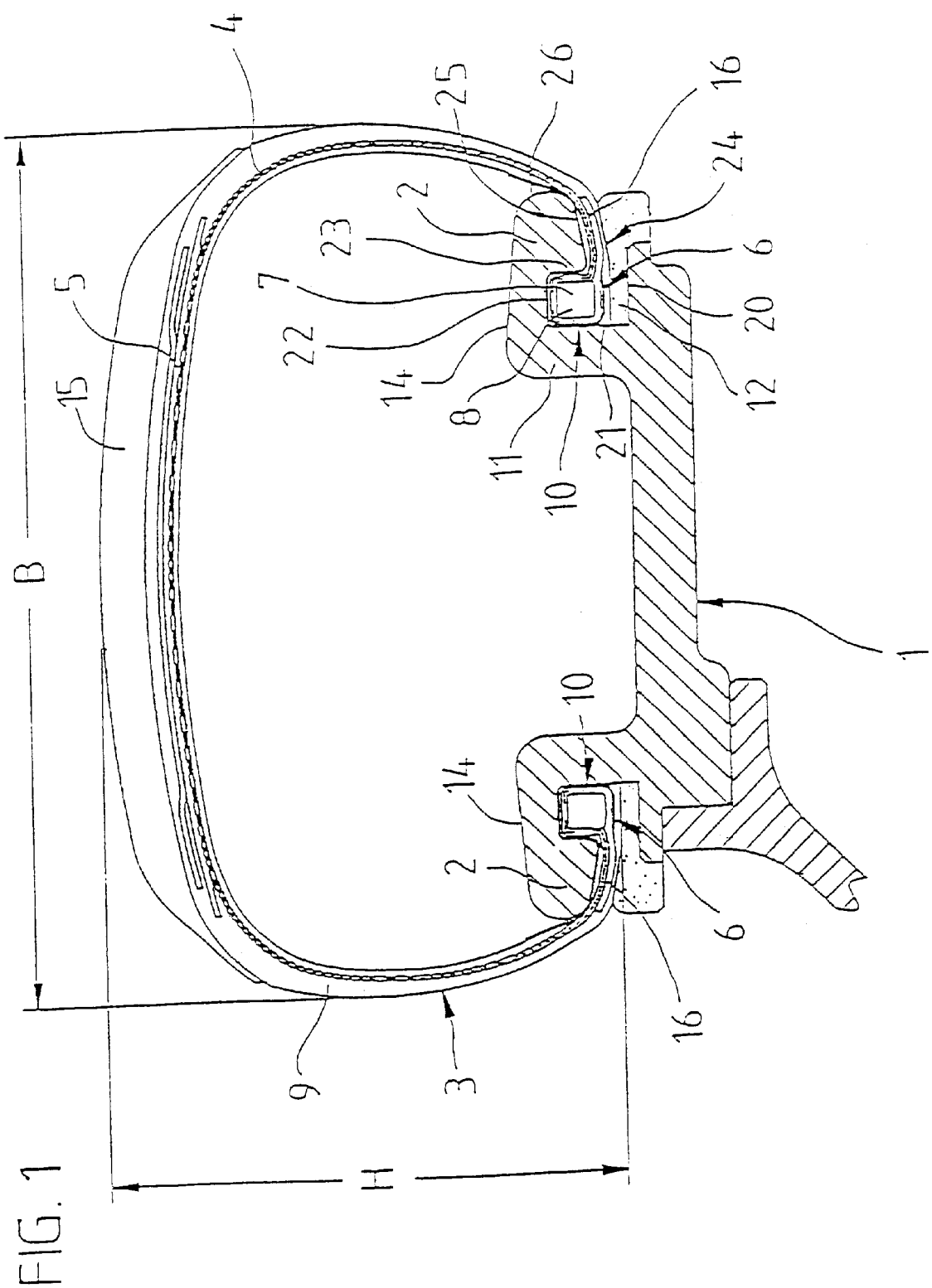
FIG. 1 illustrates a cross-sectional view of a vehicle wheel according to the invention with a mounted vehicle tire.

FIG. 1 shows a vehicle wheel with a vehicle pneumatic tire 3 and a rim 1 with a ratio of maximum height H to maximum width B of the vehicle pneumatic tire H/B≦about 0.6. The vehicle pneumatic tire 3 has an inner layer, not shown in more detail, extending over the circumference of the tire and from the left bead area 6 of the vehicle pneumatic tire to the right bead area 6, over which a carcass 4 of radial construction is constructed with, for example, one or two carcass plys. In the area of the tread, a belt 5 of known construction with, for example, two belt plys of strength supports, e.g., of steel cord, embedded in rubber, is laid radially outside the carcass 4. The belt extends over the entire circumference of the tire and extends in the axial direction from one tire shoulder area to the other.

The steel cords run at an acute angle of, e.g., about 10–30° to the circumferential direction. It is conceivable to wind a belt bandage, not shown, with strength supports, for example, of nylon, running essentially in the circumferential direction radially outside the belt plys.

A tread 15 of rubber material that extends over the circumference of the tire and extends from shoulder area to shoulder area is laid in a known manner radially outside the belt or belt bandage. Rubber material is laid on the carcass 4 in the sidewall area 9. The sidewall rubber material extends from the shoulder area to the bead area 6.

One-piece rim 1 is formed in one piece on both its axial front faces with a ring chamber 10 arranged concentrically to the rim and having a radially inner ring chamber wall 20, an axially inner ring chamber wall 21, a radially outer ring chamber wall 22, and an axially outer ring chamber wall 23. The ring chamber wall 23 limits the radially inward-facing rim flange 2. From axially outwards towards the ring chamber, a ring-shaped passage aperture 24 is formed axially inwardly between rim flange 2 and radially inner ring chamber wall 20. On its side 25 facing radially inwardly, the rim flange 2 is conically widened from axially inwards to axially outwards and is curved on its front face 26. On the radially outer side of the rim flange, an emergency saddle 11 extends with its emergency 25 running saddle surface 14 axially inwardly over the position of the ring chamber 10. Each emergency running saddle surface extends axially inwardly until the belt in its axial edge zones is covered axially about 10 to 30%, e.g., about 25%, from the shoulder respectively.

Lower sidewall areas 16 of the vehicle pneumatic tire 3 grip the flanges 2, which extend radially inwardly. The curvature of the front face 6 of the flange corresponds to the desired tire contour in the area of the flange.

Bead area 6 with a bead-like thickening 7 formed on the inside of the tire is formed at the end of the lower sidewall area 16. The bead is formed with an elastically extensible and elastically compressible core 8 embedded in the carcass ply end. In the mounted state according to FIG. 1, the bead area 6 fills about ½ to ⅔ of the ring chamber space under positive engagement with the axially inner ring chamber wall 21 and the radially outer ring chamber wall 22, as well as with the axially outer ring chamber wall 23. Radially inside the bead, a filling ring 12 is formed with radial positive engagement to the bead area 6 radially outwardly and radially inwardly to the radially inner ring chamber wall 20, which filling ring extends in the axial direction from the ring chamber wall 10 over the entire axial length of the bead area 6 through the ring aperture 24 axially outwards. The filling ring 12 is designed so as to be cylindrical over the entire axial length area of the ring chamber and thus of the bead at its radially outer jacket surface and also axially outside the ring chamber. In the embodiment of FIG. 1, the filling ring 12 extends in the axial direction as far as the axial position of the front face 26 of the rim flange. The bead in the embodiment according to FIG. 1 is under positive engagement radially outwardly, axially inwardly, and axially outwardly to the closed ring chamber walls 22, 23, and 21, and by the radial positive engagement to the filling ring 12 which, for its part, is formed with radial positive engagement to the closed ring chamber wall 20, also to the ring chamber wall 20 in radially positive engagement. Since the bead is formed over its entire surface in positively engaged contact with the one-piece ring chamber or the filling ring 12, and the filling ring 12 inside the ring chamber is formed, for its part, with its surface in complete contact with the ring chamber walls or the bead, the ring chamber is completely filled by the bead and filling ring. Moreover, the lower sidewall area 16 is in full contact with the radially inner conical rim flange side 25 and with the correspondingly formed conical outside surface of filling ring 12 even in the axial extension area of the rim flange.

The complete positive engagement of the bead to the rim secures the seat of the tire on the rim during driving.

The tire sidewall is adjacent only under initial stress in the area of the forepart 26 of the flange 2 of the rim.

When a circumferential element of the tire meets the road surface, resulting normal forces F act between the vehicle pneumatic tire and the road surface. When these forces are damped, a resulting force $F_A$, which essentially acts in the axial direction, acts on the sidewalls 9 of the tire and bends the sidewall slightly more. Based on the selected initial tension between the front face 26 and the tire, the tire in this normal load case still lies adjacent to the front face 26 when the initial tension is reduced. During travel around curves, the initial tension between the front face 26 and the tire sidewall is increased in the area of the particularly strongly loaded outer side of the curve owing to the introduced forces. Thus, the vehicle pneumatic tire 3 is stiffened by the flange on the side loaded particularly strongly. Safe handling is ensured.

When strong impacts affect the tire, stronger resulting forces $F_A$ act on the tire sidewalls. The latter swell further axially outwards during the damping. The sidewall area available for this purpose for flexible bending of the sidewall then extends from the shoulder area of the tread to over the entire curved area of the front face 26. During strong impacts, the tire sidewall 9 lifts away in the area of the front face 26, forming a gap between the front face 26 and the tire sidewall.

Particularly strong impacts acting on the tire can also be damped safely owing to the large bend radius R and the very long arc length available for bending, of the tire sidewall between the tire shoulder and the cylindrical rim surface, with a low surface loading of the curved sidewall surfaces.

Figure 5A:
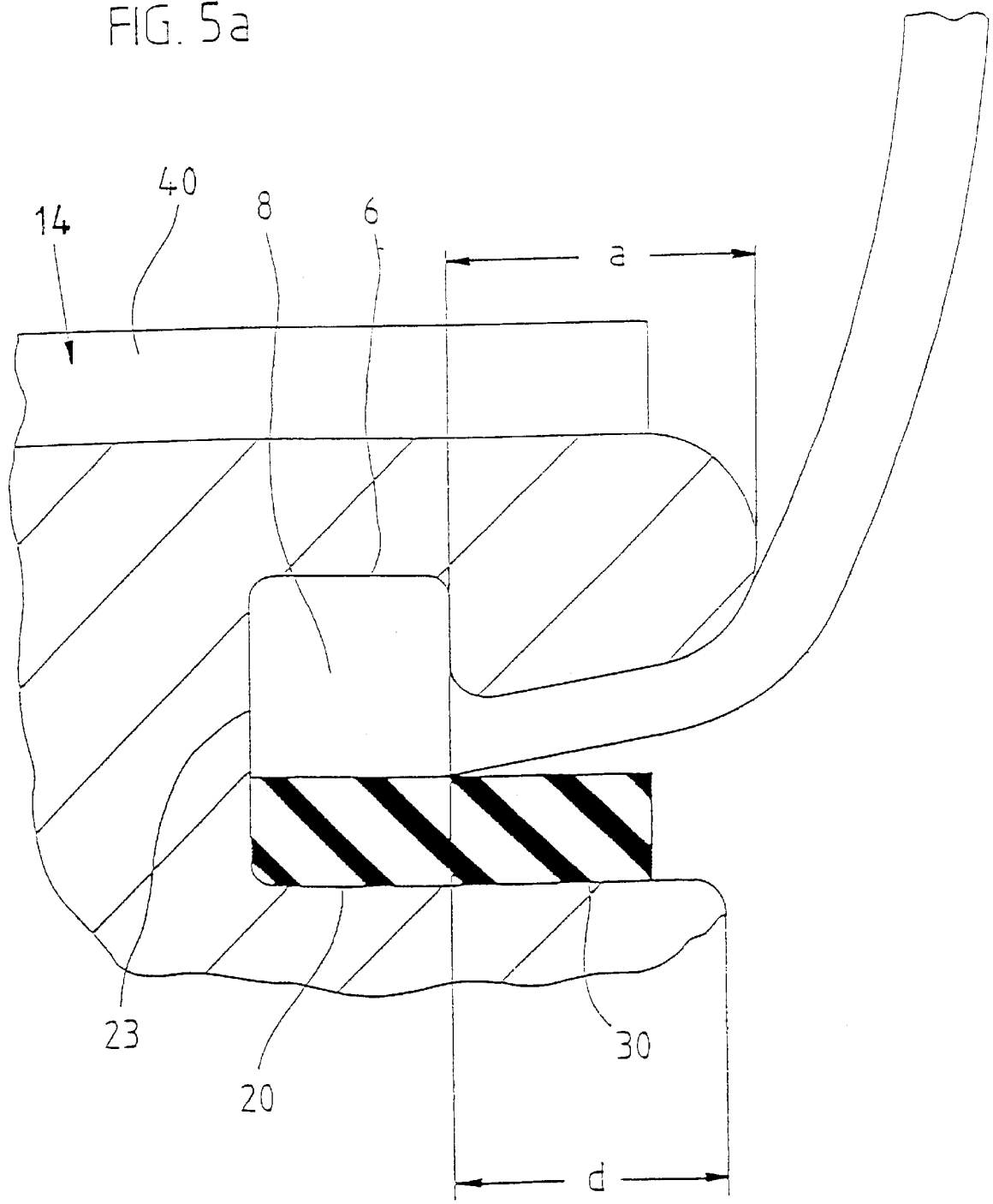

Emergency running saddle 11 reaching to the axial inside can extend over an entire circumferential area of the tire and, as is shown in FIG. 5a, is provided with an emergency running support layer 40 extending over the circumference. Thus, in the case of a sudden loss of internal pressure, the tire can supports itself with its tread area on the emergency running support layer 40 of emergency running saddle 11 that is provided on both sides and is formed essentially cylindrically or to the axial inside with a slightly conically expanded surface with an angle of inclination of about 0°–10° to the axial direction. In this manner, premature destruction and removal of the tire are avoided.

Emergency running support layer 40 may be formed of hard plastic, rubber, or plastic foam, which is insensitive to impact for damping purposes and has good gliding properties for emergency running operation.

FIG. 5b shows a design of emergency running support layer 40 in which filamentary or belt-shaped strength supports arranged parallel to one another are embedded in support layer 40. In the design shown, these strength supports may be monofilaments or multifilaments made of either textile, e.g., nylon, Kevlar, polyester, or steel. They extend over the circumference of the rim and are aligned at an angle of about 0°–30° to the circumferential direction of the rim.

Figure 6B:
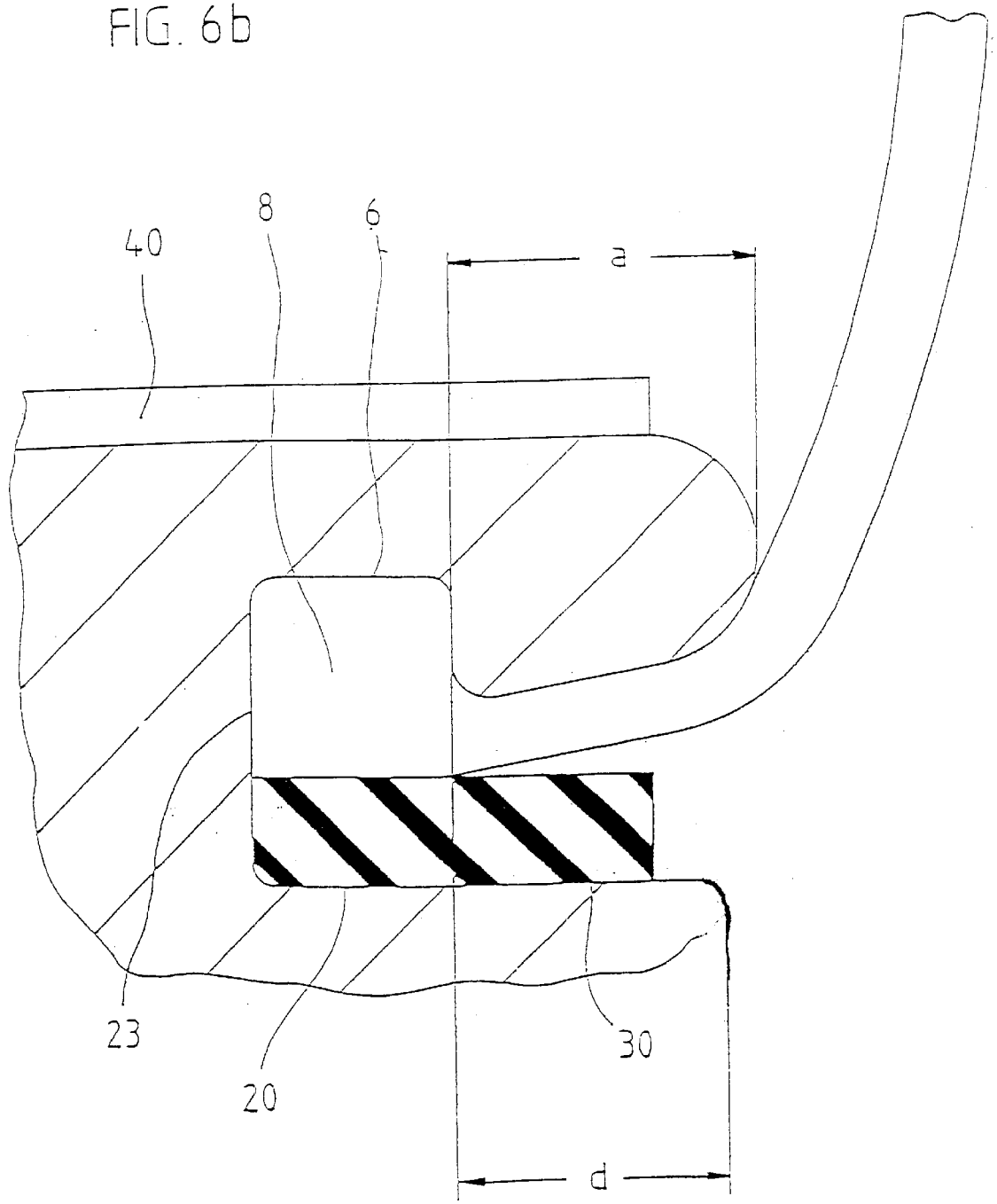

FIGS. 6a–6d illustrate show how emergency running support layer 40 can be produced on the emergency running saddle of the metallic rim. To begin with, as shown in FIG. 6a, the emergency running saddle is shown without a support layer. As shown in FIG. 6a, a ply 40' of plastically deformable, unvulcanized rubber or plastic material can be put in the operating position of the emergency running support surface on emergency running saddle 11. In the case of the embodiment shown in FIG. 5a, ply 40' of plastically deformable, unvulcanized rubber or plastic material is then vulcanized. The finished, vulcanized ply 40' of damping rubber or plastic material forms emergency running support surface 40 important for emergency running operation.

In the case of the embodiment shown in FIG. 5b, after a ply 40' of plastically deformable, unvulcanized rubber or plastic material has been put in the operating operation of the emergency running support surface on emergency running saddle 11, as shown in FIG. 6b. Strength supports 41 can be positioned on ply 40', as shown in FIG. 6c. Then, as shown in FIG. 6d, another ply 40" made of plastically deformable, unvulcanized rubber or plastic material is put on ply 40' and the strength supports 41. Afterwards, plies 40' and 40" of plastically deformable, unvulcanized rubber or plastic material are vulcanized. The finished, vulcanized plies 40', 40" of damping rubber or plastic material with strength supports 41 embedded in them form emergency running support surface 40 important for emergency running operation.

The strength supports, for example, metallic or textile monofilaments or multifilaments of a known type, are placed equidistant from one another or, if different strength progressions of the emergency running support surfaces are desired, with interval differences corresponding to these strength progressions. They extend at least over the entire circumference of the rim at an angle of about 0° to 30° to the circumferential direction of the rim. It is also possible to wind one or more strength supports, e.g., metallic or textile monofilaments or multifilaments of a known type, continuously over the circumference of the rim helically from the one axial side to the other axial side at an acute angle of about 0° to 30° to the circumferential direction of the rim.

Figure 2A:
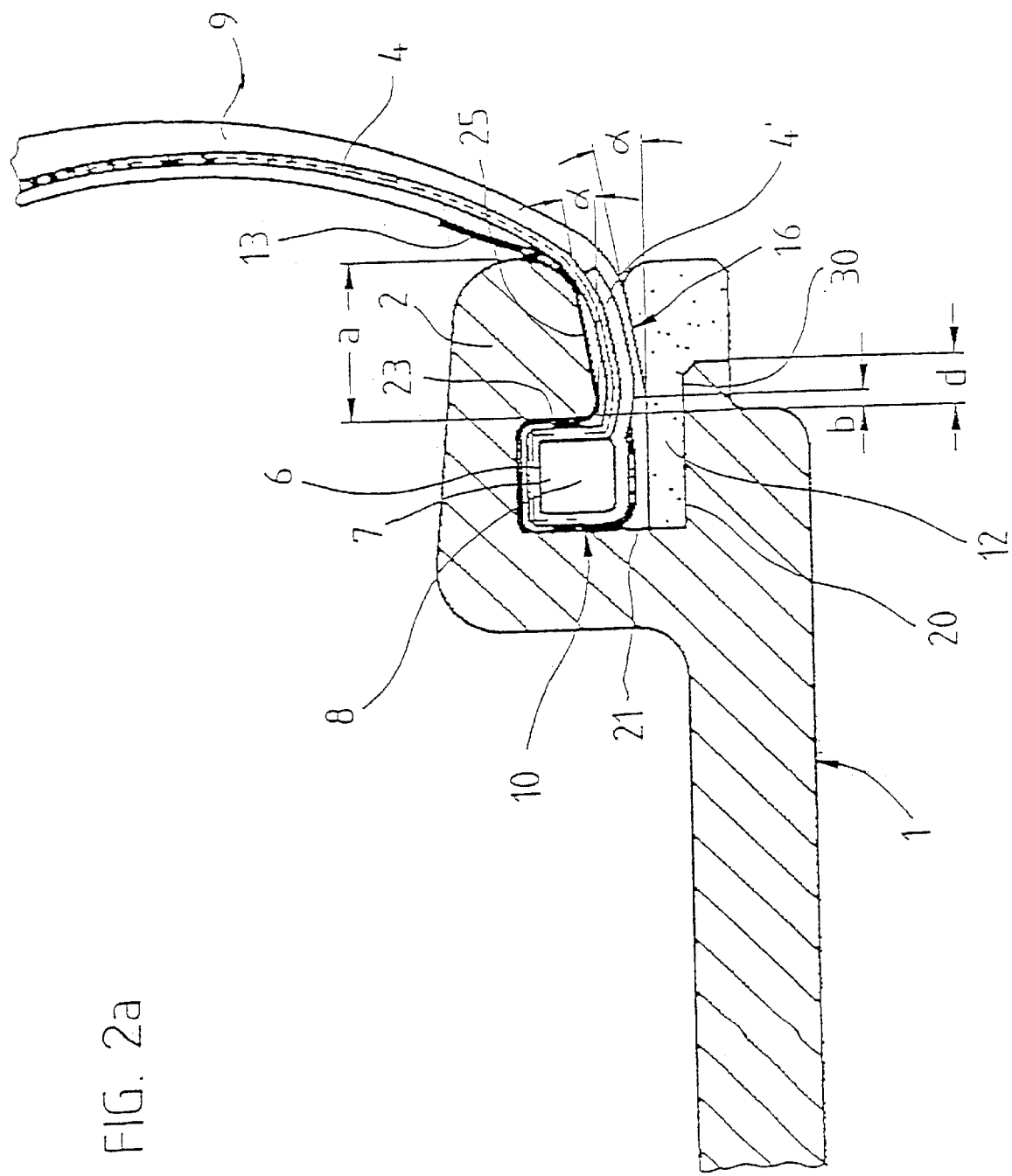
FIG. 2a, 2b, 2c, and 2d illustrate embodiments of the filling ring in cross section.

FIG. 2a shows an enlarged detailed representation of the outside edge area of the rim from FIG. 1. It is evident from FIG. 2a that the inside 25 of the rim flange expands conically starting from the ring chamber wall 23, forming an angle α to the wheel axis toward the axially outside to a curved forepart 26 of rim flange 2. The radially outer surface of filling ring 12 is formed cylindrically starting from ring chamber wall 21 over the entire axial extension area of the ring chamber to ring chamber wall 23 and in the axial lengthening from the ring chamber to an axial distance b to ring chamber wall 23. Starting from a circular line at distance b to ring chamber wall 23, the radially outer carcass surface of filling ring 12 is formed to be conically expanded outwards in the axial direction parallel to inside 25 of rim flange 2 also forming the angle α to the wheel axis towards the axial outside. Like rim flange 2, filling ring 12 still extends over a distance "a" from ring chamber wall 23 axially outwardly. Filling ring 12 is positioned so that it can be displaced axially on a cylindrical load-bearing surface 30 of the rim. Load-bearing surface 30 forms the radially inner ring chamber wall 20 inside the ring chamber. Load-bearing surface 30 extends to the axial outside up to a distance d from ring chamber wall 23. Filling ring 12 is formed to be thickened toward the radially inner to a shoulder axially outside distance d and is adjacent with this at a correspondingly formed shoulder of the rim. Distances a, b, d can be selected in such a manner that a is greater than d and d is greater than b. The angle α is between about 20–200. In the embodiment depicted, it is approximately 100. In this manner, the bead with its thickening 7 and the adjacent lower sidewall area 16 between inner rim flange 25 and filling ring enclose the rim flange in a guided manner, thereby also securing the anchoring of the tire in the rim.

Filling ring 12 can be made of rubber or an elastic plastic with a self-locking surface. Producing filling ring 12 from a non-elastic plastic or metal is also conceivable. To the extent necessary in individual cases, it is also possible to fix the filling ring axially in a mounted state with its shoulder on the corresponding shoulder of the rim using a screwed connection, for example.

Figure 2B:
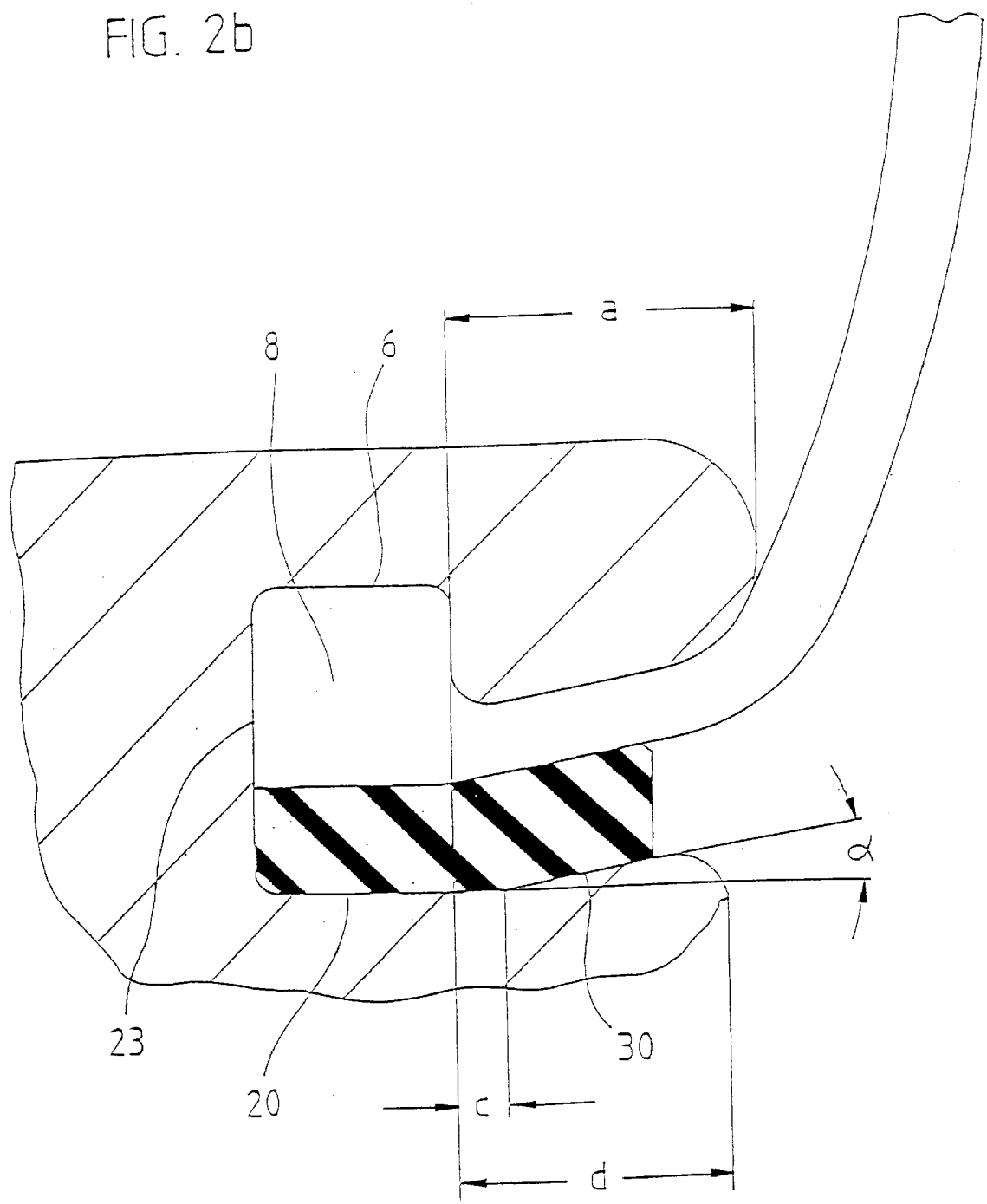
Figure 2C:
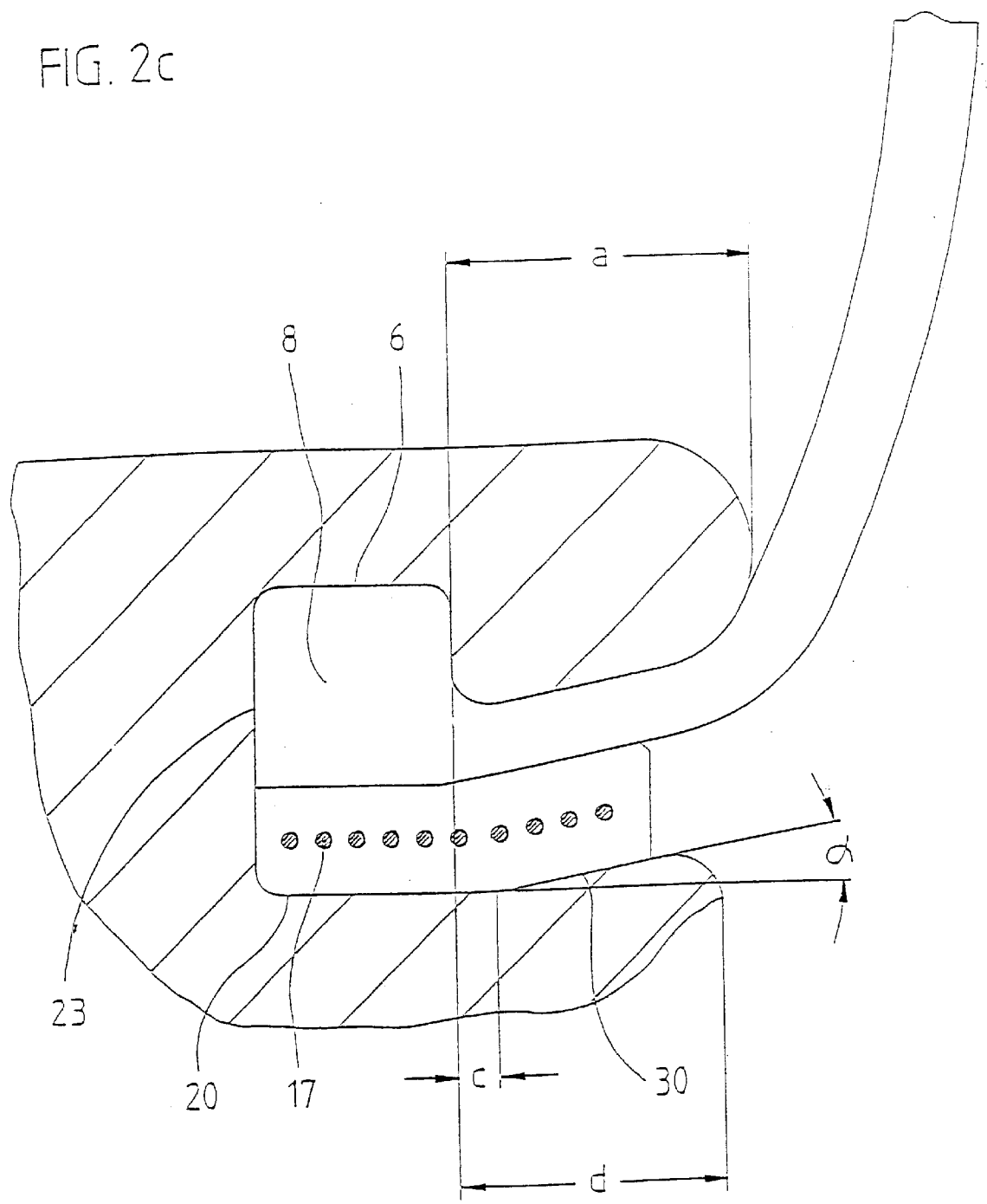
Figure 2D:
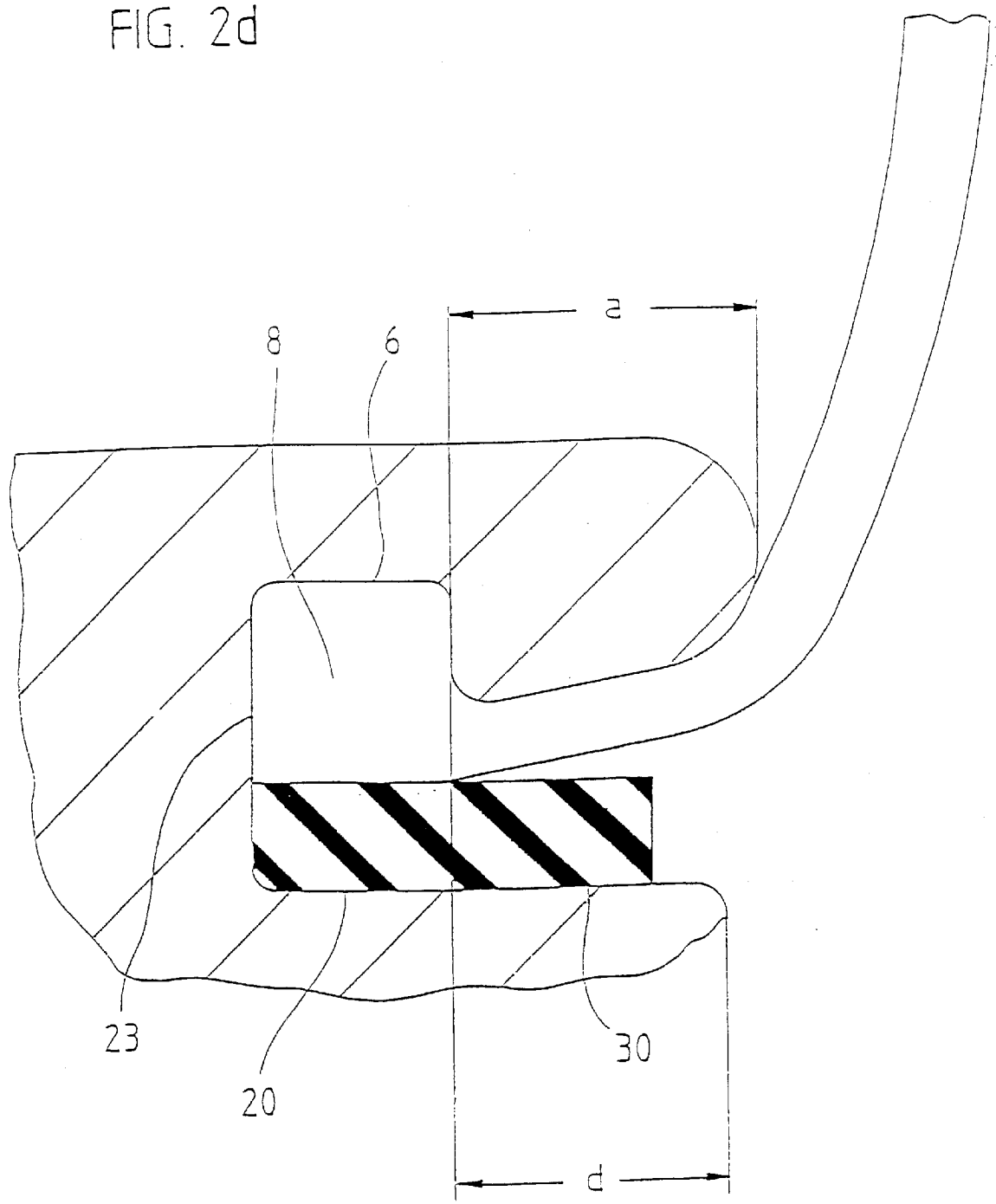

Alternative designs of filling ring 12 are depicted in FIGS. 2b, 2c, and 2d. Load-bearing surface 30 extends axially up to a distance c, which is less than or equal to distance a, from ring chamber sidewall 23 to the outside. The radially outer surface of filling ring 12 is also formed conically starting from am axial position of ring chamber wall 23 and progressing with an angle of inclination α. Like the correspondingly formed load-bearing surface 30, the radially inner surface of filling ring is also formed to be conically expanded starting from an axial position at a distance c from the ring chamber sidewall to the axial outside also with an angle α to the wheel axis. The distance c is less than a. Due to this conical design, the elastic filling ring 12 is also secured in its mounted position by axial positive engagement.

FIG. 2c shows a filling ring like the one depicted in FIG. 2b, which, however, contains strength supports 17 running essentially in the circumferential direction that are embedded in elastic rubber or plastic material. Strength supports 17 give filling ring 12 additional hold on load-bearing surface 30. Strength supports 17 can be several highly tensile strength supports wound in the circumferential direction that are arranged next to one another. In another design, one or more strength supports 17 can be arranged next to one another and continuously wound in a helical manner around the axis of the filling ring from one axial end to the other axial end of the filling ring. The distances between the neighboring windings are equidistant. Different distances can also be selected if this is significant for achieving an even more secure fixing of the filling ring on the load-bearing surface 30. Strength supports 17 can be monofilaments or multifilaments made of steel. In another design, strength supports 17 can be textile monofilaments or multifilaments. It is also conceivable to construct strength supports 17 of woven textile strips. Reinforcing filling ring 12 using strength supports 17 of the type described is also possible with the embodiment depicted in FIG. 2*a*.

FIG. 2*d* illustrates a filling ring that has a cylindrical radially outer surface over its entire axial extension. The radially inner surface is also essentially cylindrical. In this case as well, filling ring 12 can be constructed with or without strength supports 17, as described in the above-mentioned embodiments.

Figure 3A:
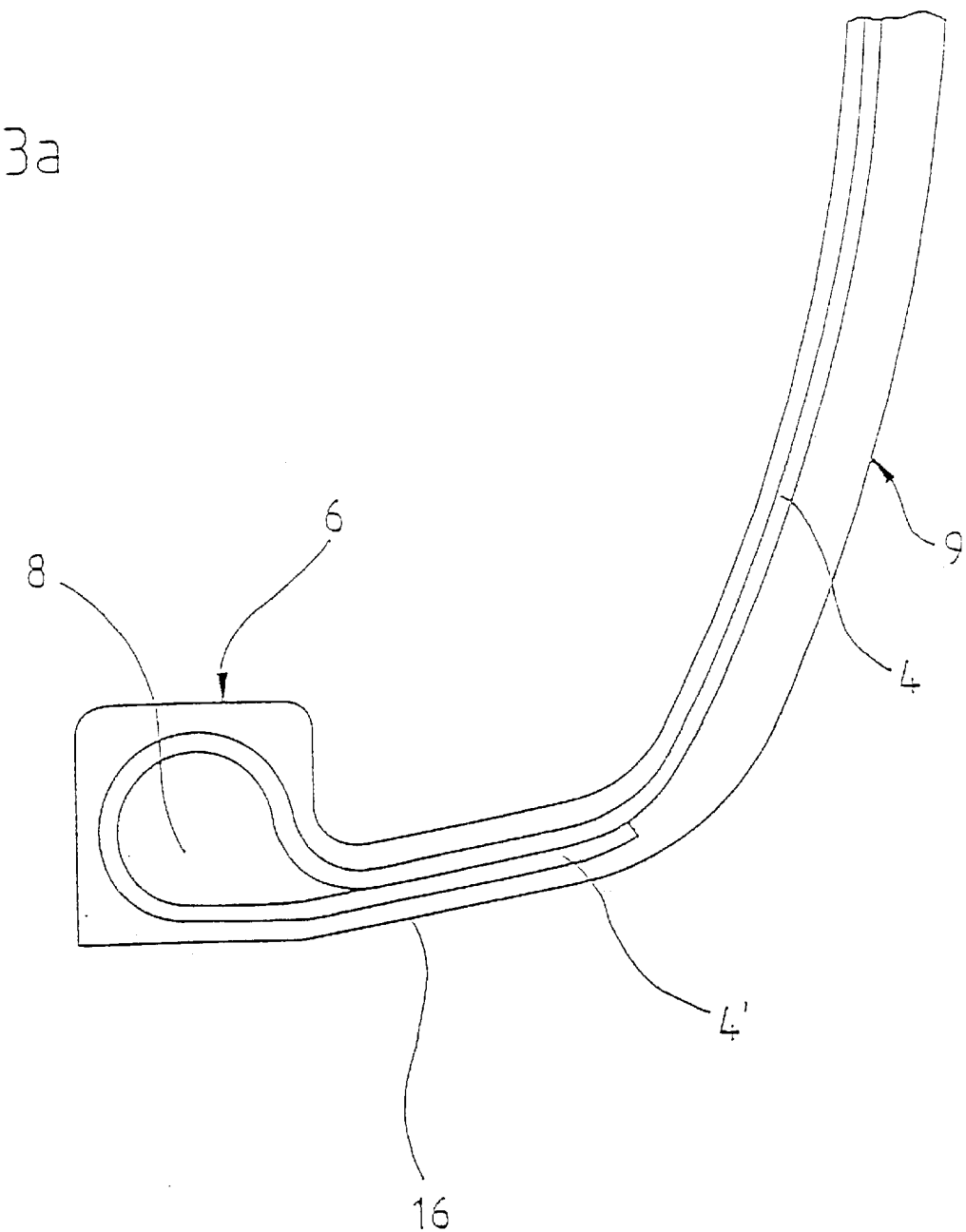

As shown in FIGS. 1, 2, and 3*a*, bead core 8 is anchored by embedding core 8 in carcass 4 by turning carcass 4 around core 8 from the inside to the outside or, as shown in the exemplary embodiment of FIG. 3*b*, from the outside to the inside. Carcass 4 may be wound tightly around core 8 and turnover 4', just like in the other exemplary embodiment of turnover 4", follows core 8 in direct contact with the main part of the carcass. Core 8 is formed to be drop-shaped and tapered to the contact point between the turnover and the main part of the carcass. To form core 8, an elastic rubber material with a Shore A hardness of about 80–100, preferably about 85–90, is selected (in the exemplary embodiment shown in FIG. 1, the Shore A hardness is about 87), which has an elastic extensibility in the circumferential direction of the core of about 5–30%, for standard tire dimensions of about 10–20%, and an elastic compressibility of about 1–5%, for standard tire dimensions of about 2.5–3.5%.

The core may be produced by extrusion using injection molding or comparative known techniques.

It is also conceivable to construct the bead in a coreless manner such that, in this exemplary embodiment as well (not shown), the rubber material of the bead is selected in such a way that the bead has the cited extension and compression properties in the circumferential direction.

If the abrasion, between the rim flange and the lower sidewall is undesirably high, it is possible, as shown by way of example in FIGS. 1 and 2*a*, to design an additional strip 13 between rim flange 2 and the bead of abrasion-resistant material, e.g., made of abrasion-resistant rubber or plastic. The abrasion-resistant strips can reach into the ring chamber and be turned around the bead there.

Figure 4A:
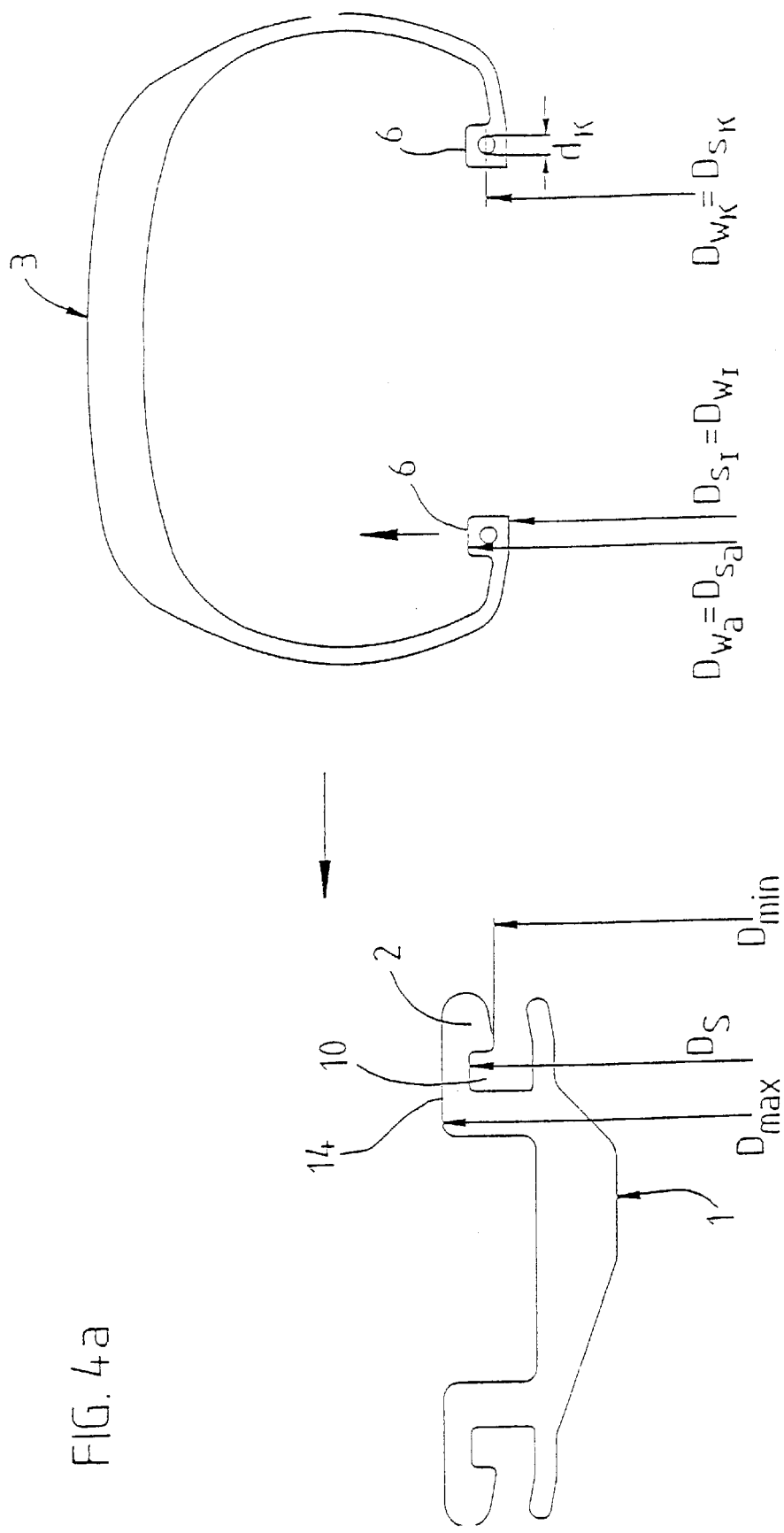
FIGS. 4a–4f schematically illustrate mounting and dismounting.

The mounting of the tire on a rim is described below, based on the schematic representations of FIGS. 4*a* to 4*f*. Emergency running support surfaces 14 have a maximum outside diameter Dmax and the two rim flanges have a minimum inside diameter Dmin. The tire bead in FIG. 4*a* is in the unstretched and uncompressed state. Its outside diameter Dwa corresponds to the diameter of radially outer ring chamber wall 22 and thus to the outside diameter of the bead Dsa in its seated position in the ring chamber. Its inside diameter Dwi corresponds to the diameter of the radially outer jacket surface of filling ring 12 in the ring chamber and thus to the inside diameter of the bead Dsi in its seated position in the ring chamber. The core with a thickness d, e.g., about 10 mm, in the radial direction has in the radial position of the half radial thickness an average core diameter Dwk through the tire axis, which diameter corresponds to the average core diameter Dsk in the seated position of the bead in the ring chamber. Dmax is greater than Dsa, Dsa is greater than Dsk, Dsk is greater than Dmin, Dmin is greater than Dsi.

Figure 4B:
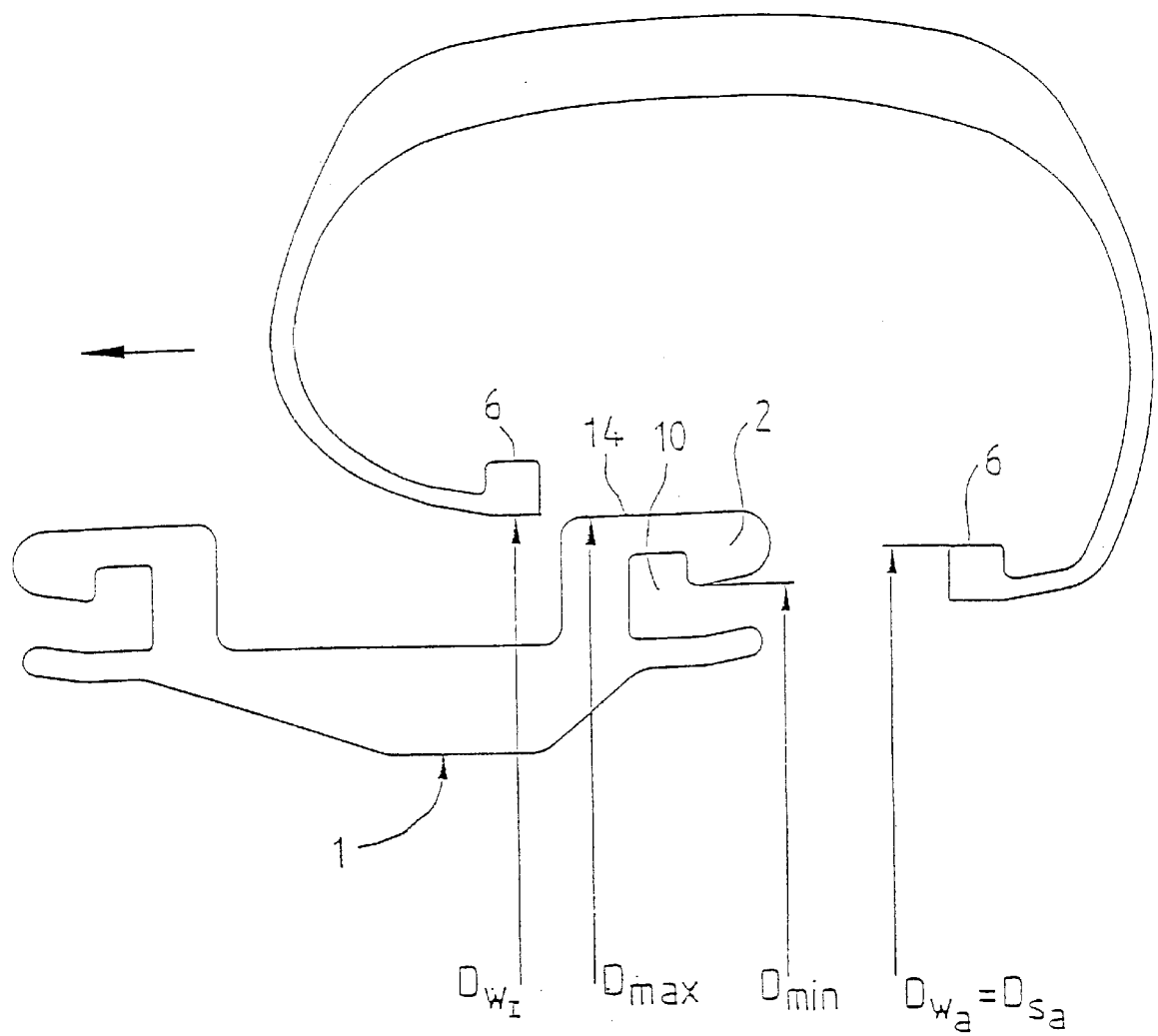
Figure 4C:
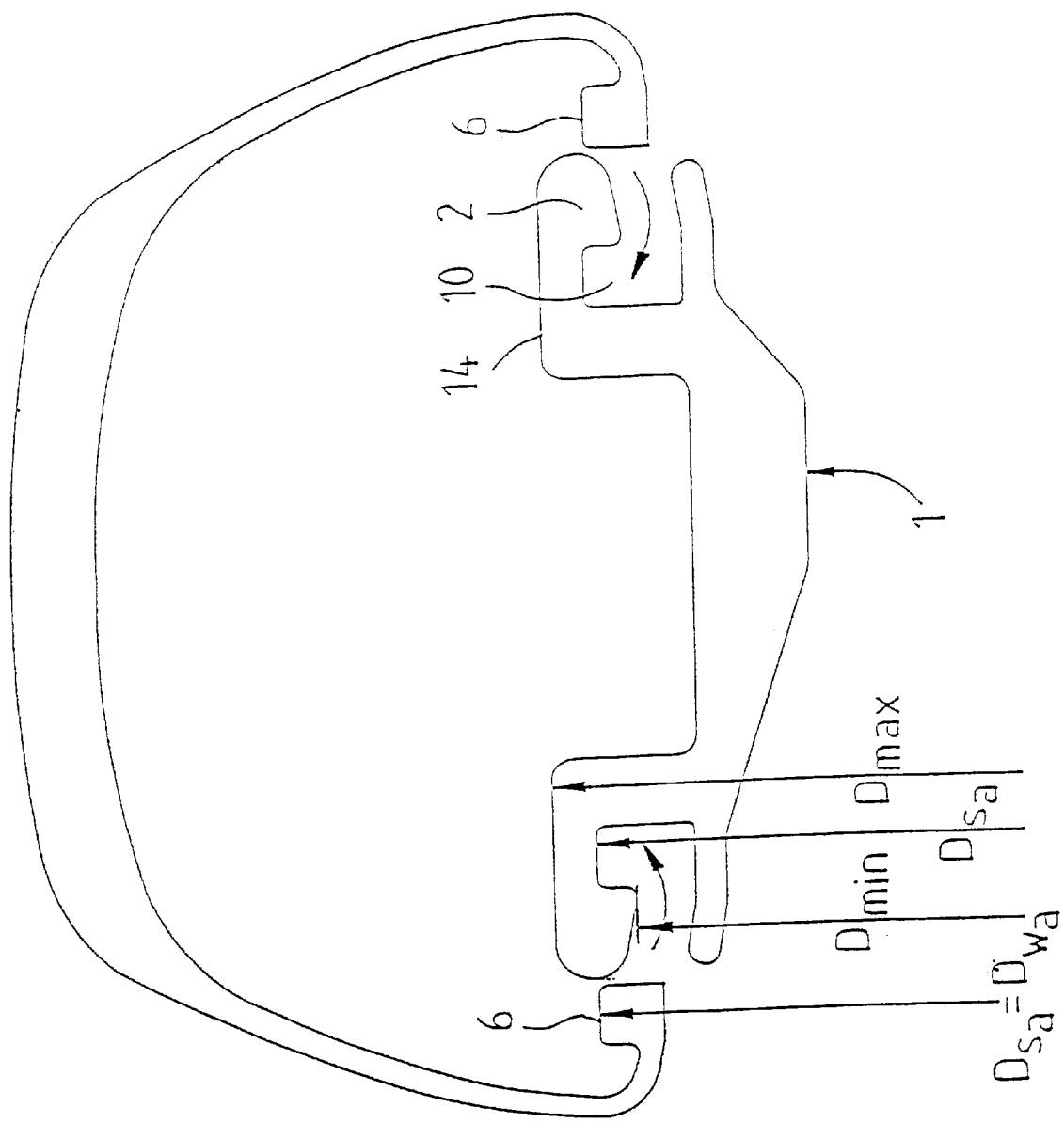
Figure 4D:
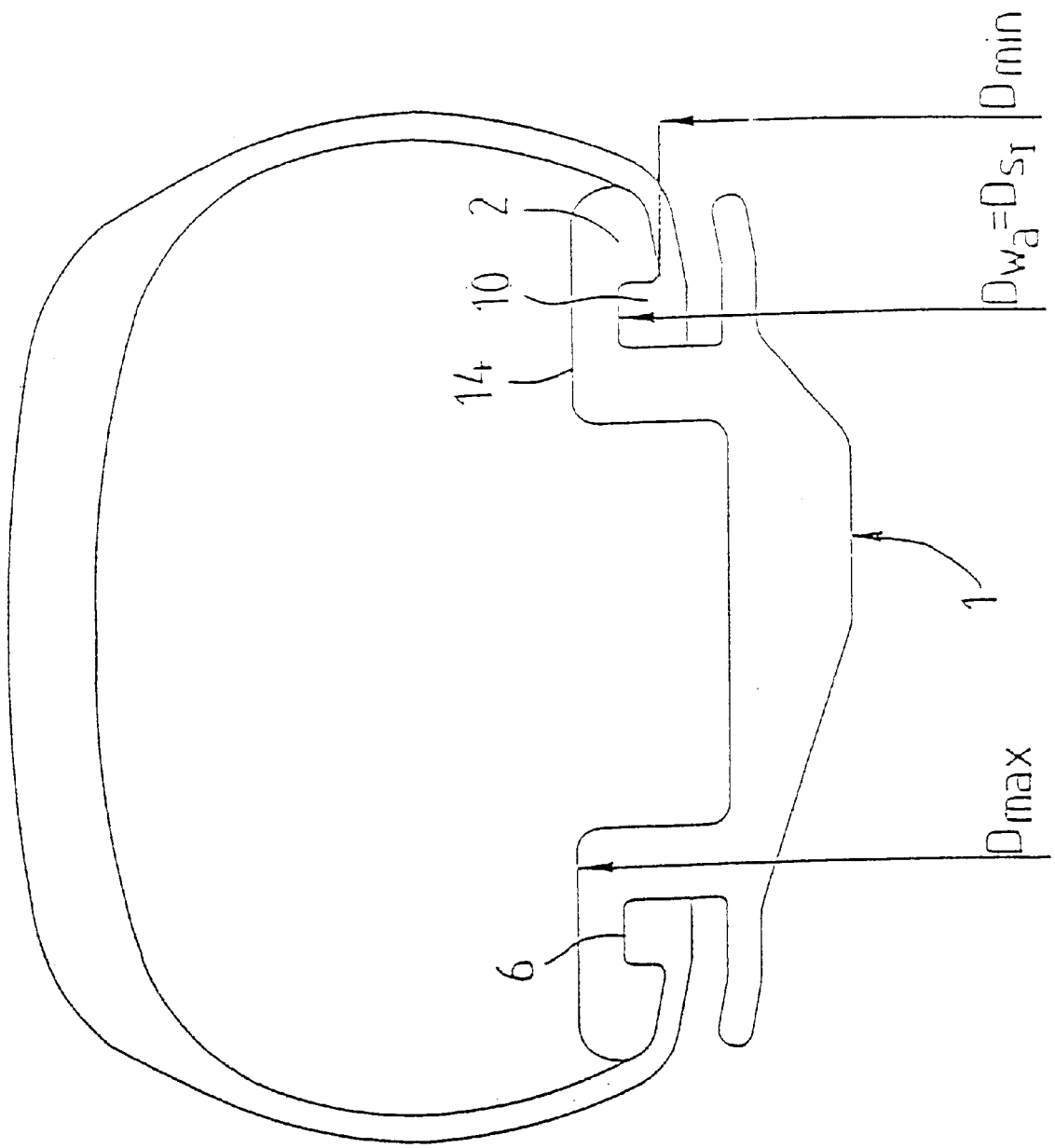
Figure 4E:
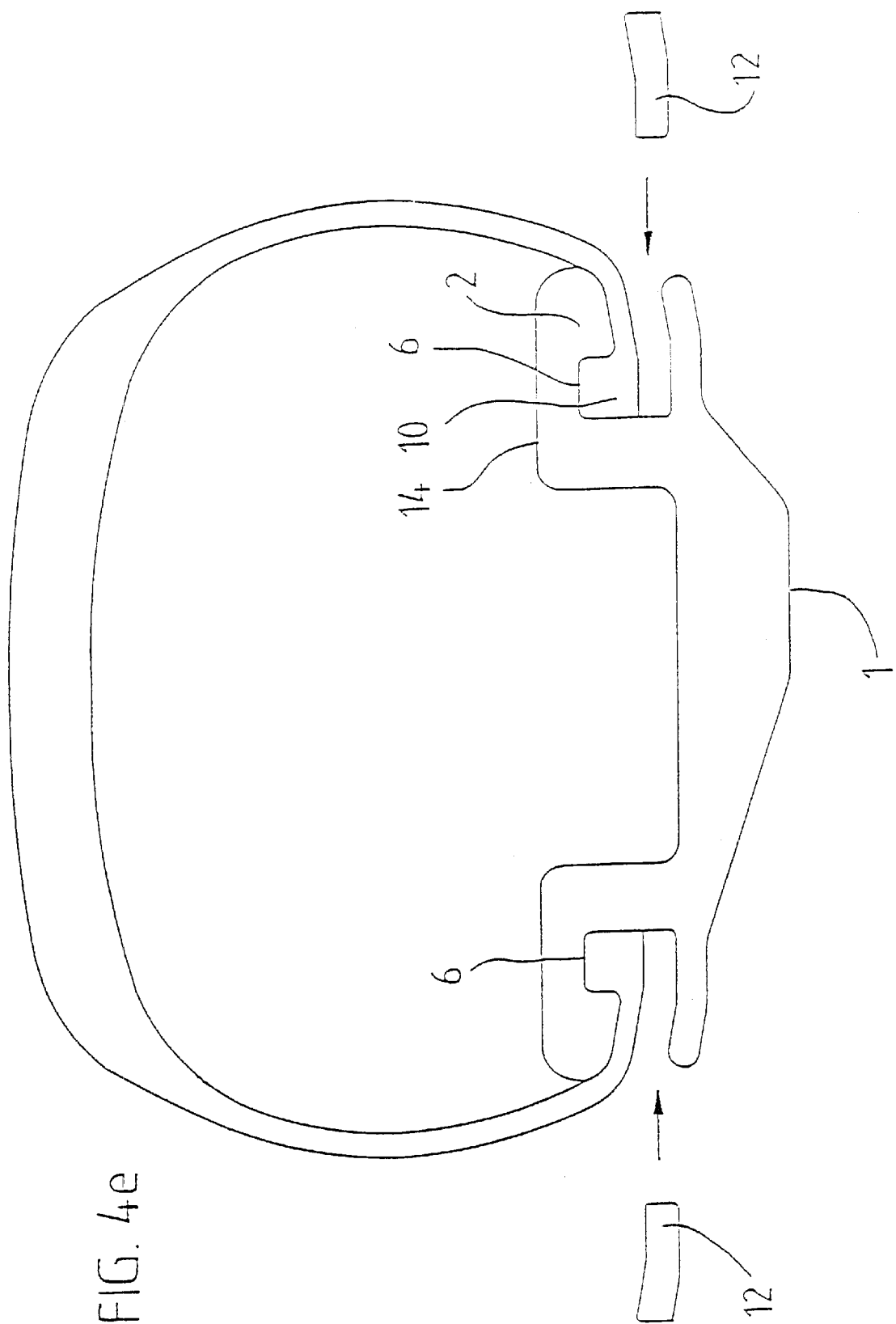
Figure 4F:
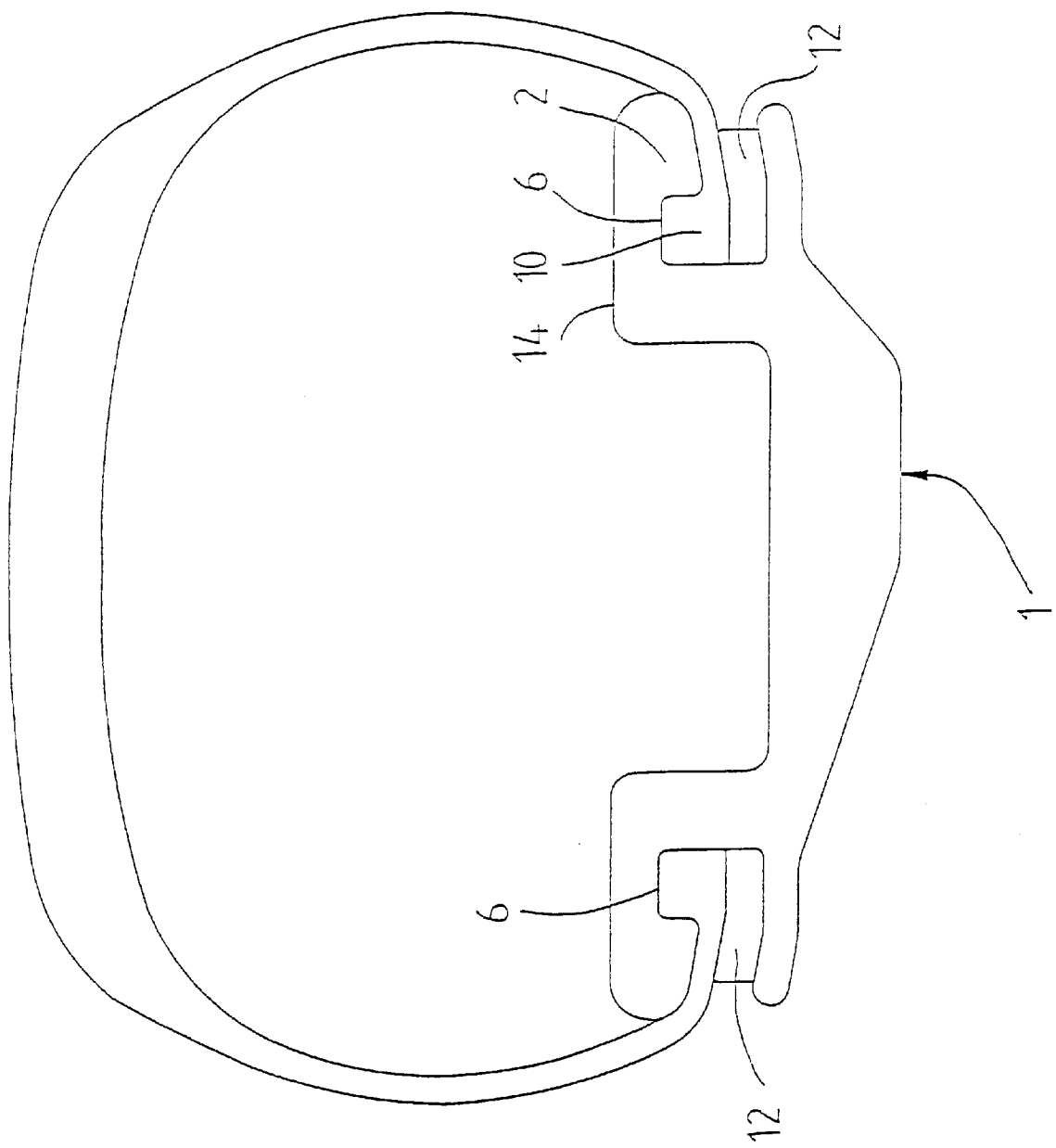

For mounting, tire 3 is brought axially from the right concentrically to the rim at the rim in the figures. The left bead is stretched in the circumferential direction against the elastic restoring forces of the bead, until the inside diameter Dwi of the bead is greater than the maximum outside diameter Dmax of the emergency running support surfaces. Then, as shown in FIG. 4*b*, the tire 3 is moved further axially to the rim concentrically to the rim such that the left bead, while maintaining its stretched state, is pushed axially over the rim with play to the emergency running support surfaces 14. As soon as the left bead has reached a position on the left side axially outside the left rim flange, the bead is restored to its circumferential length, utilizing the elastic restoring forces, until it reassumes its unstretched and uncompressed state. In this state Dwi again corresponds to Dsi, Dwa again corresponds to Dsa, and Dwk likewise again corresponds to the average diameter Dsk of the core in its seated position in the ring chamber. As shown by the arrow in FIG. 4*c*, both beads are now compressed in their circumferential length against the elastic recovery forces until the outside diameter Dwa of the bead is smaller than the minimum rim flange diameter Dmin. In this state, the beads are introduced axially into the respective ring chamber, with play to the rim flange. Utilizing the elastic restoring forces, the beads are again restored to their circumferential length until they reassume their unstretched and uncompressed state. Owing to the conicity of the bead sides facing the ring chamber walls 21 and 23 and the correspondingly conical ring chamber walls 21 and 23, the beads are positioned precisely in their operation position in the ring chamber as their circumferential lengths are restored. In this state, Dwi again corresponds to Dsi, Dwa again corresponds to Dsa, and Dwk likewise again corresponds to the average diameter Dsk of the core in its seated position in the ring chamber. The beads sit in the ring chamber unstretched and uncompressed. This state is shown in FIG. 4*d*. As shown in FIG. 4*e*, a filling ring 12 is now introduced axially from axially outside between the lower sidewall area 16 of the tire and the bearing surface 30 until the ring chamber is completely filled by the bead and filling ring. The complete positive engagement is produced between the one-piece ring chamber and the bead, as shown in FIG. 4*f*.

For demounting, filling ring 12 is correspondingly first removed axially outwards. Then the beads are compressed until they can be pulled from the ring chamber with play to the rim flange. After the restoration of its circumferential length, a bead is stretched until it can be pulled axially from the rim with play to the emergency running support surfaces.

It is also conceivable, instead of displacing the tire axially for mounting, first to turn it by 90° and then to stretch it and to push it onto the rim in the radial direction in the stretched state, in order to then turn it back again by 90° so that the two beads are each situated axially outside the rim. The remainder of the mounting takes place as described above.

In an exemplary embodiment, the diameter Dmax is, for example, about 1.2 times greater than the inside diameter Dsi of the bead in its seated position in the ring chamber and the minimum rim flange diameter is smaller than the outside diameter Dsa of the bead in its seated position in the ring chamber by a factor of about 1.025. As the rubber material of the bead, a rubber material is selected that has an extensibility and compressibility that allow the bead to be stretched and compressed in the circumferential direction such that the bead can be moved axially over the emergency running support surface 14 and into the ring chamber with play. For example, a known rubber material is used that enables a circumferential stretching of the bead by about 25% and a circumferential compression by about 2.7%.

The emergency running support surfaces can also be formed with a greater or smaller maximum outside diameter Dmax, corresponding to the emergency running properties of a tire to be adjusted individually. The maximum diameter Dmax of the emergency running support surfaces is optimally greater here than the inside ring diameter Dsi of the bead core in the mounted state of the vehicle wheel by a factor of about 1.1 to 1.2 for standard tires. In special cases, however, it can also be greater than the inside ring diameter Dsi of the bead core in the mounted state of the vehicle wheel by a factor of between about 1.05 and 1.3. As the rubber material of the bead, a rubber material is selected that has an extensibility and a compressibility that allow the bead to be stretched and compressed in the circumferential direction such that the bead can be moved axially over the emergency running support surface 14 and into the ring chamber with play. Accordingly, the bead, which is unstretched and uncompressed in the mounted state of the vehicle wheel, is formed in such a way that it has an extensibility of between about 10–20% and a compressibility of about 2.5 to 3.5% for standard tires and, in special cases, has an extensibility of between about 5 and 30% and a compressibility of between about 1 and 5%.

After inserting the bead in the ring chamber, it is also conceivable to introduce filling ring 12 by injecting thermosetting plastic material from the axial outside through the opening of the ring chamber.

It is also conceivable to design emergency running saddle 11 on the radially outer surface whose emergency running support surface extends over the entire axial center area of the rim. Even this emergency running support surface can be produced according to the description of the depiction of FIGS. 5a and 5b, and 6a–6d. Emergency running support surface 11 can be formed, e.g., over the entire axial belt width of the tire.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE CHARACTERS

1 Rim
2 Rim flange
3 Vehicle pneumatic tire
4 Carcass
5 Belt
6 Bead area
7 Thickening
8 Core
9 Sidewall
10 Ring chamber
11 Emergency running saddle
12 Filling ring
13 Abrasion-resistance strip
14 Emergency running saddle surface
15 Tread
16 Lower sidewall area
17 Strength support
20 Ring chamber wall
21 Ring chamber wall
22 Ring chamber wall
23 Ring chamber wall
24 Ring opening
25 Inside of the rim flange
26 Forepart of the rim flange
30 Load-bearing surface
40 Emergency running support layer
41 Strength support

What is claimed:

1. A rim of a vehicle tire for tubeless pneumatic tires comprising:

a radially outer surface;

an emergency running support surface formed on said radially outer surface; and said emergency running support surface comprising an annular layer of at least one of rubber, rubber-like material, and plastic, wherein said annular layer is vulcanized onto said radially outer surface;

at least one ring chamber composed of one piece in an axial forepart of said rim, which is arranged to accommodate a tire bead and to fasten a tire onto said rim;

said at least one ring chamber comprising a radially inner ring chamber wall, a radially outer ring chamber wall, an axially inside ring chamber wall oriented toward a center of said rim and an axially outside ring chamber wall that oriented toward an outside of said rim, wherein said axially outside ring chamber wall delimits a rim flange that is arranged from radially inside to axially outside toward said axial forepart in a radially outer area; and an annular passage opening formed in a radially inner area, which arranged for inserting and removing the tire bead.

2. A vehicle wheel, comprising:

a tubeless pneumatic tire;

a rim comprising a load bearing structure arranged to form a radially outer surface;

an emergency running support surface coupled to said radially outer surface; and said emergency running support surface comprising an annular layer of at least one of rubber, rubber-like material, and plastic, wherein said annular layer is vulcanized onto said radially outer surface.

3. The vehicle wheel in accordance with claim 2, wherein said rim is a one-piece rim.

4. The vehicle wheel in accordance with claim 2, wherein said tubeless pneumatic tire comprises sidewalls and beads which are thickened on each sidewall toward an inside of said pneumatic tire to fasten the pneumatic tire to the rim, wherein said rim comprises at least one ring chamber formed as a single piece in an axial forepart of the rim with a radially inner ring chamber wall, a radially outer ring chamber wall, an axially inside ring chamber wall that is oriented toward a center of said rim and an axially outside ring chamber wall that is oriented toward an outside of said rim, wherein said axially outside ring chamber wall delimits a rim flange that is arranged from radially inside to axially outside toward said axial forepart in a radially outer area;

an annular passage opening formed in a radially inner area, which arranged for inserting and removing the tire bead; and a filling ring adapted to be solidly mounted radially with positive engagement within said ring chamber on said radially inner ring chamber wall, wherein said sidewalls, at least in the operating state of the vehicle wheel, extend from axially outside through said annular passage opening toward said ring chamber wall, and said bead is adapted to be solidly mounted in said ring chamber radially on a radial outside and is adapted to be positively engaged, at least to the radial outside and an axial outside to said ring chamber so that said bead is connected with positive engagement with said rim to said radially outside, to said axially outside, to said axially inside and over said filling ring to said radially inside, wherein said bead is supported radially inwardly completely on said filling ring over its entire axial extension.

5. The vehicle wheel in accordance with claim 2, wherein said pneumatic tire includes a bead adapted to coupled said pneumatic tire to said rim, wherein said bead comprises a variable circumferential length.

6. The vehicle wheel in accordance with claim 5, wherein said bead is variable in an elastic manner.

7. A vehicle wheel comprising:

a tubeless pneumatic tire;

a rim comprising a radially outer surface;

an emergency running support surface formed on said radially outer surface; and said emergency running support surface comprising an annular layer of at least one of rubber, rubber-like material, and plastic, wherein said annular layer is vulcanized onto said radially outer surface, said pneumatic tire includes a bead adapted to coupled said pneumatic tire to said rim, and said bead comprises a variable circumferential length, and wherein an axial position of said emergency running support surface formed in said radially outer carcass surface corresponds at least partially to an axial position where said bead is fastened in said rim.

8. A vehicle wheel comprising:

a tubeless pneumatic tire;

a rim comprising a radially outer surface;

an emergency running support surface formed on said radially outer surface; and said emergency running support surface comprising an annular layer of at least one of rubber, rubber-like material, and plastic, wherein said annular layer is vulcanized onto said radially outer surface, and wherein said emergency running support surface is formed on at least one axial side area of said radially outer surface, and is arranged to extend axially so that, toward the inside, a belt of said pneumatic tire is covered about 10–30% in its axial edge zones by a shoulder of said rim.

9. The vehicle wheel in accordance with claim 2, wherein said pneumatic tire includes a bead comprising a rubber core, wherein said rubber core has a Shore A hardness in a range of about 80–100.

10. The vehicle wheel in accordance with claim 9, wherein said Shore A hardness of said rubber core is in the range of about 85–90.

11. A vehicle wheel comprising:

a tubeless pneumatic tire;

a rim comprising a radially outer surface;

an emergency running support surface formed on said radially outer surface; and said emergency running support surface comprising an annular layer of at least one of rubber, rubber-like material, and plastic, wherein said annular layer is vulcanized onto said radially outer surface, wherein said filling ring is adapted for at least one of detaching and fastening a bead of said pneumatic tire through axial movement, wherein said at least one ring chamber comprises a load-bearing surface on a radially inner side which extends over an entire axial extension, over which said filling ring is adapted to axially slide on and axially pull off, and wherein said filling ring comprises a load-bearing surface on a radial inner side.

12. The vehicle wheel in accordance with claim 2, wherein a maximum diameter of said emergency running support surfaces is greater by a factor of between about 1.05–1.3 than an inside ring diameter of a bead core in a mounted state of said vehicle wheel.

13. The vehicle wheel in accordance with claim 12, wherein the maximum diameter of said emergency running support surfaces is greater by a factor of between about 1.1–1.2 than the inside ring diameter of the bead core in the mounted state of the vehicle wheel.

14. The vehicle wheel in accordance with claim 2, wherein said pneumatic tire includes a bead core having at least one of an extensibility and compressibility of between about 5–30%.

15. The vehicle wheel in accordance with claim 14, wherein said at least one of the extensibility and compressibility of said bead core is between about 10–20%.

16. The vehicle wheel in accordance with claim 2, wherein said pneumatic tire includes a bead core having an extensibility of between about 5–30%, and a compressibility of between about 1–5%, and wherein said bead core is at least one of unextended and uncompressed in a mounted state of the vehicle wheel.

17. The vehicle wheel in accordance with claim 16, wherein said bead core has an extensibility of between about 10–20%, and a compressibility of between about 2.5–3.5%.

18. The vehicle wheel in accordance with claim 2, wherein said pneumatic tire comprises a bead, which is adapted to fasten the pneumatic tire to said rim, and wherein said pneumatic tire is positioned adjacent to said rim in a lower sidewall area.

* * * * *